(12) United States Patent
Kirchmeier et al.

(10) Patent No.: US 8,280,012 B2
(45) Date of Patent: Oct. 2, 2012

(54) NOTIFICATION SYSTEM MANAGEMENT

(75) Inventors: Steve Kirchmeier, Glendale, CA (US); Cinta Putra, Glendale, CA (US)

(73) Assignee: Everbridge, Inc.

( * ) Notice: Subject to any disclaimer, the term of this patent is extended or adjusted under 35 U.S.C. 154(b) by 982 days.

(21) Appl. No.: 12/277,246

(22) Filed: Nov. 24, 2008

(65) Prior Publication Data

US 2009/0131088 A1 May 21, 2009

Related U.S. Application Data

(62) Division of application No. 10/877,796, filed on Jun. 25, 2004, now Pat. No. 7,664,233.

(60) Provisional application No. 60/503,260, filed on Sep. 16, 2003, provisional application No. 60/482,362, filed on Jun. 25, 2003.

(51) Int. Cl.
*H04M 11/00* (2006.01)

(52) U.S. Cl. ............ 379/37; 369/45; 369/41; 369/93.24

(58) Field of Classification Search ............... 379/37–50; 340/573.1, 573.4, 531; 707/769, 999.003; 709/225

See application file for complete search history.

(56) References Cited

U.S. PATENT DOCUMENTS

| | | | |
|---|---|---|---|
| 5,559,867 A | 9/1996 | Langsenkamp et al. | |
| 5,912,947 A | 6/1999 | Langsenkamp et al. | |
| 6,002,748 A | 12/1999 | Leichner | |
| 6,275,744 B1 | 8/2001 | Yoshida | |
| 6,359,557 B2 | 3/2002 | Bilder | |
| 6,449,365 B1 | 9/2002 | Hodges et al. | |
| 6,490,525 B2 | 12/2002 | Baron, Sr. et al. | |
| 6,493,633 B2 | 12/2002 | Baron, Sr. et al. | |
| 6,556,664 B1 | 4/2003 | Langsenkamp | |
| 6,594,345 B1 | 7/2003 | Vinson | |
| 6,633,910 B1 | 10/2003 | Rajan et al. | |
| 6,671,351 B2 | 12/2003 | Menard et al. | |
| 6,816,878 B1 | 11/2004 | Zimmers et al. | |
| 6,988,127 B2 | 1/2006 | Matsuda et al. | |
| 7,231,229 B1 | 6/2007 | Hawkins et al. | |
| 7,286,648 B1 | 10/2007 | Chang et al. | |
| 2001/0009577 A1 | 7/2001 | Orwick et al. | |
| 2002/0006126 A1 | 1/2002 | Johnson et al. | |

(Continued)

OTHER PUBLICATIONS

U.S. Patent Office, U.S. Appl. No. 12/277,232, filed Nov. 24, 2008, in Office Action, mailed May 13, 2011, 16 pages.

(Continued)

*Primary Examiner* — Melur Ramakrishnaiah
(74) *Attorney, Agent, or Firm* — Fish & Richardson P.C.

(57) ABSTRACT

Methods and systems for providing electronic notifications are described. A server is configured to serve an interface, such as a Web page, to a terminal that requests from a user a first set of user contacts to be used to provide notifications to the user by a telephonic notification system in response to a notification process initiated by an organization associated with the user. The interface further requests a first set of priorities corresponding to the first set of user contacts, wherein the notification system will attempt to provide notifications to the first set user contracts in an order based at least in part on the first set of priorities. A database is configured to store the first set of user contacts and the first set of priorities. A voice interface circuit is configured to transmit a voice notification to at least one of the first set of user contacts.

20 Claims, 23 Drawing Sheets

U.S. PATENT DOCUMENTS

| | | | |
|---|---|---|---|
| 2002/0013711 A1 | 1/2002 | Ahuja et al. | |
| 2002/0178226 A1 | 11/2002 | Anderson et al. | |
| 2002/0184346 A1 | 12/2002 | Mani | |
| 2002/0196922 A1 | 12/2002 | Marwell et al. | |
| 2003/0006912 A1 | 1/2003 | Brescia | |
| 2003/0023690 A1 | 1/2003 | Lohtia | |
| 2003/0065790 A1 | 4/2003 | Loveland et al. | |
| 2003/0093218 A1 | 5/2003 | Jones | |
| 2003/0141971 A1 | 7/2003 | Heiken, Jr. | |
| 2003/0142797 A1* | 7/2003 | Troy et al. | 379/88.12 |
| 2003/0182371 A1 | 9/2003 | Worthen | |
| 2003/0197615 A1 | 10/2003 | Roche et al. | |
| 2003/0217109 A1 | 11/2003 | Ordille et al. | |
| 2003/0220980 A1 | 11/2003 | Crane | |
| 2004/0102178 A1 | 5/2004 | Williams | |
| 2004/0193617 A1 | 9/2004 | Adler | |
| 2004/0194110 A1 | 9/2004 | McKee et al. | |
| 2004/0225733 A1* | 11/2004 | Tesink et al. | 709/225 |
| 2004/0243672 A1 | 12/2004 | Markki et al. | |
| 2005/0032517 A1 | 2/2005 | Chng et al. | |
| 2005/0034075 A1 | 2/2005 | Riegelman et al. | |

OTHER PUBLICATIONS

Handley et al., "RFC 2543—SIP: Session Initiation Protocol", Mar. 1999.

Article from Website: http://www.4mvn.com; "UMF User's Guide"; 10 pages; Jun. 5, 2003.

* cited by examiner

You can send a notification in one of three ways:

☐ Click on one of the following buttons to send a notification via the web:

send a notification
- SEND EMERGENCY MESSAGE
- SEND STANDARD MESSAGE

Initiate a conference call
- INITIATE EMERGENCY CONFERENCE
- INITIATE STANDARD CONFERENCE or ☐ Call the Automated System:
(888)440-4911 or

☐ Call a live 3n Operator:
(877)220-4911

FIG. 2B

National Notification Network - Select Groups - Microsoft...

Select Members search criteria:

first name [ ] —204E last name [ ] —206E

> SEARCH choose members:

Previous [ 1-11of14 ▼ ] Next

202E— Burton, Scott R

Camby, Nathan

Chacon, Yvette

Dover, Terrence M

Gordon, Steve

Jackson, Linda

Jackson, Mark

Johnson, Paul N

Nelson, Edward

Porter, Julie

Sampson, Mansa close window

FIG. 2E

National Notification Network - Select Groups - Microsoft...

Select Members search for broadcast:

message title [         ]

first name [         ]
last name [         ]

start date [         ]

[◁ BACK]   [▷ SEARCH]

broadcast query results:

Previous [1-11 of 31 ▼] Next

| Message Title | Initiated By | Start Date | Has Voice |
|---|---|---|---|
| test | Anish Tripathi | 04/22/2004 01:09:22 PM | |
| test | Anish Tripathi | 04/02/2004 11:45:12 PM | |
| test | Anish Tripathi | 04/02/2004 11:28:13 PM | |
| test | Anish Tripathi | 04/02/2004 11:27:29 PM | |
| dasdasd | Anish Tripathi | 04/02/2004 04:05:00 PM | V |
| sfdsdfsd | Anish Tripathi | 04/02/2004 03:48:00 PM | V |
| ss | Anish Tripathi | 04/02/2004 03:46:00 PM | |
| test | Anish Tripathi | 04/02/2004 03:43:00 PM | |
| test | Anish Tripathi | 04/02/2004 03:07:01 PM | |
| test | Anish Tripathi | 04/02/2004 03:04:00 PM | |
| ttt | Anish Tripathi | 03/25/2004 07:15:00 PM | |

FIG. 2H

Broadcast Results - 5350 (Emergency)   ☒ STOP BROADCAST

| message title: | Emergency Message for the Legal Department |
|---|---|
| message text: | There will be an emergency meeting today for the Legal Department at 4:30. Please make every effort to be on time. |

| initiated by: | Dover, Terrence | finish date: | |
|---|---|---|---|
| start date: | 03/09/2004 03:45:00 PM | response rate: | 0.0s |
| elapsed time: | 57s | termination date: | |
| terminated by: | | attachment | n/a |
| confirmation reqd | Y | | |

| confirmed: | not confirmed: | unreachable: |
|---|---|---|
| 0 | 1 | 0 | message delivery method:

Requested Cycles  3

Home Telephone     E-Mail Address 2    Work phone
Cell Phone         Fax                 Text Pager
E-Mail Address     Home Fax

☒ EXIT    ▤ REVIEW VOICE    ▤ PRINT    ☒ RE-BROADCAST

FIG. 2K

Track active Broadcasts

Active Broadcasts

Previous  1-1 of 1  Next

| Id | Message Title | Initiated By | Start Date | Stop |
|---|---|---|---|---|
| 5647 | Marketing group meeting | Dover, Terrance | 03/11/2004 01:20:00PM | 🗑 |

▶ ADVANCED SEARCH

Manage Groups manage groups:

Previous  1-8 of 13 ▽  Next

| Group Name | Created By | Creation Date |
|---|---|---|
| Accounting | Dover, Terrance M | 12/29/2003 |
| Executives | Dover, Terrance M | 12/29/2003 |
| Finance | Dover, Terrance M | 12/29/2003 |
| Human Resources | Dover, Terrance M | 12/29/2003 |
| Information Technology | Dover, Terrance M | 12/29/2003 |
| Legal | Dover, Terrance M | 12/29/2003 |
| Managers | Dover, Terrance M | 01/09/2004 |
| Marketing | Dover, Terrance M | 12/29/2003 |

▶ ADVANCED SEARCH

FIG. 5A select members search criteria first name [        ]

last name [        ]

group name [        ]

▶ SEARCH choose members:

Previous  [1-11 of 34 ▼]  Next

Allen, Cory
Arthur, Paul
Bergen, Mark, Jr.
Carter, Cathy
Cordero, Santos
Daniel, Jonathan
Executives
Foster, Connie
Gordon, Emma
Help Support Group
Lee, Harold close window

FIG. 5C select members search criteria first name [ ]

last name [ ]

> SEARCH choose members:

Previous [1-11 of 17 ▼]

Bulger, Mark
Burton, Scott R.
Camby, Nathan
Chacon, Yvette
Gordon, Steve J. Sr.
Jackson, Linda
Jackson, Mark
Johnson, Paul N.
Martin, Susan L.
Nelson, Edward
Parker, Jeffrey close window

FIG. 6B

NOTIFICATION SYSTEM MANAGEMENT

PRIORITY CLAIM

This application is a divisional of U.S. application Ser. No. 10/877,796, filed Jun. 25, 2004, and claims priority under 35 U.S.C. 119(e) of U.S. application Ser. No. 10/877,796, filed Jun. 25, 2004; U.S. Provisional Application No. 60/482,362, filed Jun. 25, 2003; and U.S. Provisional Application No. 60/503,260, filed on Sep. 16, 2003, the contents of which are incorporated herein in their entirety.

RELATED APPLICATION

This application is related to copending application, entitled EMERGENCY AND NON-EMERGENCY TELECOMMUNICATIONS GEO-NOTIFICATION SYSTEM, Ser. No. 10/877,821, filed on Jun. 25, 2004, the entirety of which is hereby incorporated by reference.

COPYRIGHT RIGHTS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to notification methods and systems, and in particular, to electronic, networked notification systems.

2. Description of the Related Art

Conventional notification systems intended for contacting known individuals, such as a company's employees, are often cumbersome to setup, operate and maintain. For example, many such notification systems have one or a few operators type in the name and phone numbers of all those to be included in a notification group, which can result in the time consuming task of typing hundreds or thousands of entries and can further result in many errors.

In addition, while there have been recent advances in communication technologies, such as cell phones, two-way pagers, SMS messaging, instant messaging, and still other communication technologies, many conventional emergency notification systems are unable to provide emergency notifications to one or more of the foregoing communication technologies. Therefore, emergency notifications, as well as other notifications, may not be communicated to a recipient as quickly or efficiently as desired.

Further, many conventional notification systems do not track whether a notification was received and/or by which means of communication the notification was received. This can result in important notifications not being actually received by the appropriate individual, or repeated notifications being sent out unnecessarily.

In addition, many conventional notification systems do not provide adequate or timely reporting of confirmations of notification receipt. Thus, the entity issuing the notification, such as in an emergency situation, cannot track in real time who has received notification.

SUMMARY OF THE INVENTION

Embodiments of the systems and processes described herein advantageously enable members of an organization to access and maintain their own notification contact information directly. Members can input, update, and maintain their own contact information and can selectively designate the privacy level of their contact information. Further, members can prioritize their contact paths and associated priorities for emergency and/or non-emergency notifications.

In addition, certain embodiments optionally enable a user to have a message, such as a text message, be communicated with multiple terminal types, such as voice-based and text-based terminals, as well as terminals that provide both voice and text interaction. For example, a user can enter a text notification message, which will then be broadcast as a text message to text-based terminals. In addition, the text message can be automatically converted to audible speech and broadcast to voice-type terminals.

Further, certain embodiments enable a notification hierarchy to be established, wherein members at different levels of the hierarchy have different levels of permissions or rights. For example, certain levels can be provided with the right to add members to a notification organization and to establish groups or subsets of the notification organization, and can further appoint leaders, such as a group leader, with more limited rights. The group leader, for example may have the right to issue notifications to members of the groups and to establish subgroups including all or a portion of the group members.

In addition, certain embodiments enable notifications to be issued based on a selected geographic area, using, for example, a Geographic Information System (GIS).

An example embodiment provides a telephonic notification system, comprising: a Web server configured to serve a Web page that requests from a user: a first set of user contacts to be used to provide emergency notifications to the user by the telephonic notification system in response to a notification process initiated by an organization associated with the user, wherein the first set of contacts includes at least a first phone number; a first set of priorities corresponding to the first set of user contacts, wherein the notification system will attempt to provide emergency notifications via the first set user contracts in an order based at least in part on the first set of priorities; a second set of user contacts to be used to provide non-emergency notifications to the user by the telephonic notification system; a second set of priorities corresponding to the second set of user contacts, wherein the notification system will attempt to provide non-emergency notifications via the second set user contracts in an order based at least in part on the second set of priorities; a database configured to store the first set of user contacts, the first set of priorities, the second set of user contracts, and the second set priorities; and a voice interface circuit configured to transmit a voice notifications to at least one of the first set of user contacts and the second set of user contacts.

Another example embodiment provides a method of providing notifications, the method comprising: storing in computer readable memory a first set of contact paths for a user, wherein the first set of contact paths is to be used when providing a first type of notification to the user; storing in computer readable memory an order of use associated with contact paths in the first set of user contacts paths; storing in computer readable memory a second set of contact paths for the user, wherein the second set of contact paths is to be used when providing a second type of notification to the user; storing in computer readable memory an order of use associated with contact paths in the second set of contact paths; receiving from an instruction to issue a notification including a notification message to a group including the user, wherein the instruction indicates whether the notification is the first type of notification or the second type of notification; based at least in part on the instruction, identifying which of the first set of contact paths and the second set of contact paths is to be used in providing the notification message to the user; accessing the identified set of contact paths from the computer readable memory; and at least attempting to provide the notification message to the user using the identified set of user contacts paths based on the associated order of use.

An example embodiment provides an electronic notification system, comprising: a server configured to serve an interface to a user terminal that requests from a user: a first set of user contacts to be used to provide notifications to the user by the electronic notification system in response to a notification process initiated by an organization associated with the user; a first set of priorities corresponding to the first set of user contacts, wherein the electronic notification system will attempt to provide notifications to the first set user contracts in an order based at least in part on the first set of priorities; a database configured to store the first set of user contacts and the first set of priorities; and a voice interface circuit configured to transmit a voice notifications to at least one of the first set of user contacts.

Another example embodiment provides a method of providing notifications, the method comprising: storing in computer readable memory a first set of contact paths for a first user; storing in computer readable memory a first order of use associated with contact paths in the first set of user contacts paths; receiving an instruction to issue a notification including a notification message to a group of users, the group including the first user; accessing the first set of contact paths from the computer readable memory; and at least attempting to provide the notification message to the first user using the first set of contact paths and the associated first order of use.

An example embodiment provides a method of providing notifications, the method comprising: storing in computer readable memory a first set of contact paths for a first user, wherein the first set of contact paths includes a first contact path associated with a voice-based terminal and a second contact path associated with a text-based terminal; receiving from a second user a notification message including text, wherein the notification message is to be broadcast to at least the first user; receiving from the second user an instruction to broadcast the notification message to at least the first user; accessing the first set of contact paths from the computer readable memory; converting the notification message text to speech via a text-to-speech module; transmitting the speech to the voice-based terminal using the first contact path; and transmitting the notification message text to the text-based terminal using the second contact path.

Another example embodiment provides a method of providing a notification message, the method comprising: transmitting to a first terminal associated with an organization administrator a notification group creation form; receiving from the organization administrator, via the first terminal, a first group name for a first group and recording the first group name in a database; transmitting to the first terminal names of organization members; receiving via the first terminal a selection of one or more organization members; storing in computer readable memory an association of the at least one or more selected members with the first group name; transmitting to the first terminal names of organization groups; receiving via the first terminal a selection of at least one of the organization groups; receiving an instruction from an authorized organization member to issue a notification to the selected at least one group; and at least partly in response to the instruction, broadcasting the notification to the selected at least one group.

An example embodiment provides a notification system, comprising: a notification database; and a telephone network interface; a computer system coupled to the notification database and the telephone network interface, the computer system including program code stored in computer readable memory configured to: transmit to a first terminal associated with an organization administrator a notification group creation form; receive from the organization administrator a first group name for a first group and to record the group name in the notification database; transmit to the first terminal names of organization members stored in the notification database; receive via the first terminal a selection of one or more organization members; store in the notification database an association of the at least one or more selected members with the first group name; receive an instruction from an authorized organization member to issue a notification to the first group; and at least partly in response to the instruction, broadcast the notification to the first group via the telephone network interface.

Another example embodiment provides a method of managing electronic notifications, the method comprising: storing in computer readable memory associated with a notification system a first role designation for a first user, wherein the first role designation is associated with a first plurality of permissions, including permissions to: add members to an organization set; halt notification broadcasts before they are completed; initiate notifications to members in the organization set; review notification broadcast results for notification broadcasts to members of the organization set; define groups, including at least a first group, the groups including subsets of the organization set members; delegate at least a portion of first role permissions to selected organization set members; storing in computer readable memory a second role designation for a second user, wherein the second role designation is associated with a subset of the first plurality of permissions, the subset including less than all first plurality of permissions, the subset of permissions including at least permissions to: initiate notifications to members in the first group; review notification broadcast results for notification broadcasts to members of the first group; and storing in computer readable memory a third role designation for a third user, wherein the third role designation is associated with at least permissions to provide notification contact paths for the third user.

BRIEF DESCRIPTION OF THE DRAWINGS

Exemplary embodiments are illustrated in the accompanying drawings, which are for illustrative purposes only. The drawings comprise the following figures, in which like numerals indicate like parts.

FIGS. 2A-M illustrate example user interfaces.
FIGS. 5A-D illustrate example group management user interfaces.
FIGS. 6A-B illustrate example authority delegation user interfaces.

DETAILED DESCRIPTION OF PREFERRED EMBODIMENTS

Figure 1:
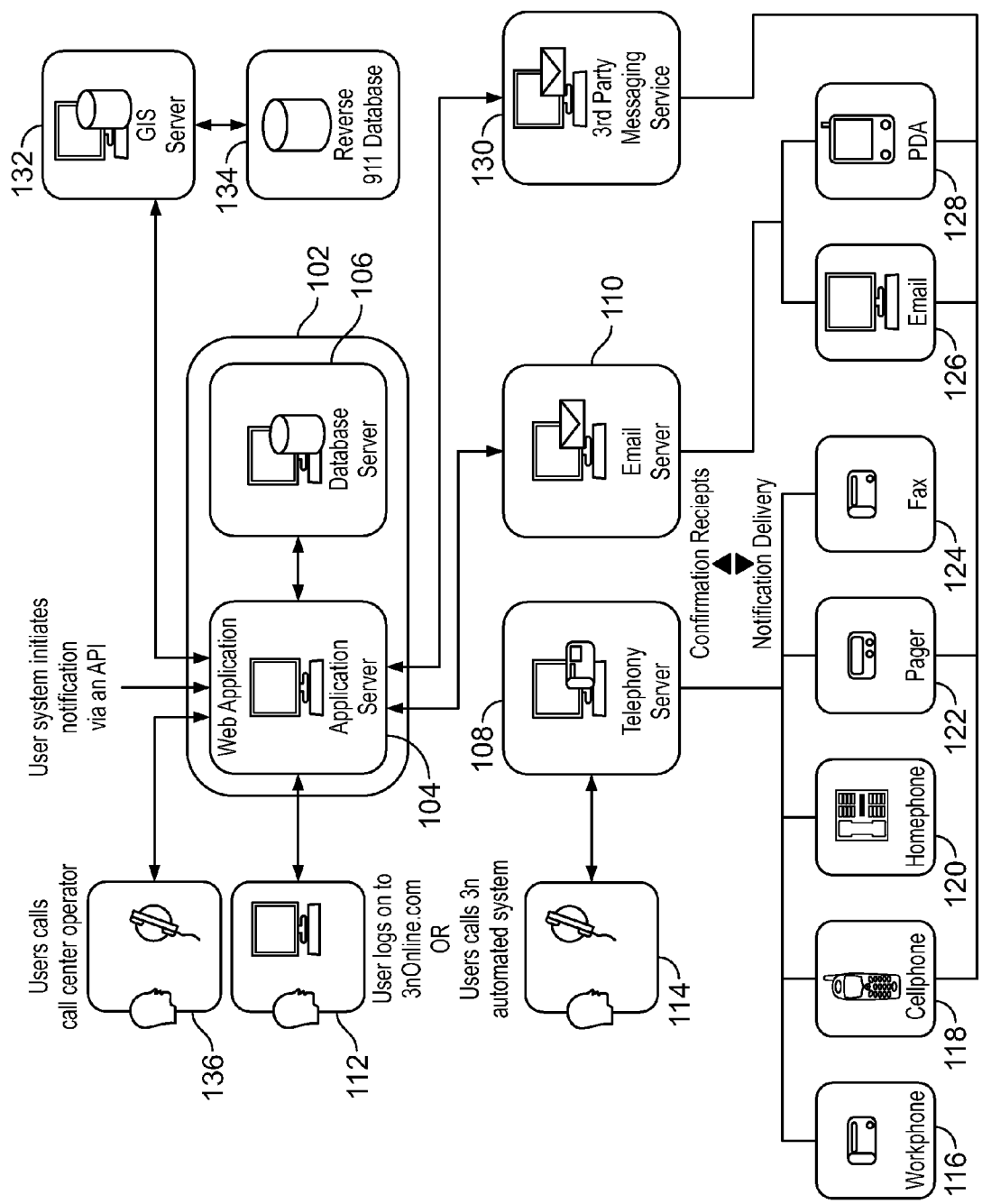
FIG. 1 illustrates an example notification system.

Throughout the following description, unless otherwise indicated, the functions described herein are preferably performed by software modules including executable code and instructions running on one or more general-purpose computers. The computers can include one or more central processing units (CPUs), that execute program code and process data, memory, including one or more of volatile memory, such as random access memory (RAM) for temporarily storing data and data structures during program execution, non-volatile memory, such as a hard disc drive, optical drive, or FLASH drive, for storing programs, data, and databases, as well as one or more network interfaces for accessing an intranet and/or Internet. While the description of an example embodiment may refer to a database, other data stores can be used as well.

In addition, the computers can include a display for displaying user interfaces, data, photographs, images, and the like. The computers can also include one or more user input devices, such as a keyboard, mouse, pointing device, microphone and/or the like, used to navigate, provide commands, enter information, and/or the like. However, the present invention can also be implemented using special purpose computers, state machines, and/or hardwired electronic circuits. For example, users can utilize personal digital assistants, Web-enabled phones, wireless phones, or wired phones to interact with the notification system described herein. In addition, the example processes described herein do not necessarily have to be performed in the described sequence, and not all states have to be reached or performed.

Further, while the following description may refer to "clicking on" a link, button, checkbox, or pressing a key in order to provide a command or make a selection, the commands or selections can also be made using other input techniques, such as using voice input, pen input, mousing or hovering over an input area, selecting menu options, and/or the like. Still further, while data or information may be described as being presented in a list, other forms of presentation, such as tables, organization charts, Venn diagrams, or still other presentations can be used.

In addition, while certain processes and functions may be described as being performed by a Web-based application operated by an application service provider, other architectures can be used, such as a client/server based system architecture, an in-house architecture, wherein the system is hosted on the user's premises, a hosted architecture, wherein the software is designed to run locally but runs on a remote computer system operated by a vendor, and/or a peer-to-peer system architecture.

In addition, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together over public and/or private networks, such as the Internet, an intranet, peer-to-peer networks, etc. Furthermore, while the following description relates to an embodiment utilizing the Internet and related protocols, other networks, such as networked interactive televisions, and other protocols may be used as well. Further, while the user interface forms or screens described herein can be implemented using HTML, other formatting languages or programming languages can be used as well.

As will be described in greater detail herein, embodiments of the present invention provide notification systems and processes. In contrast to many conventional notification systems, an example embodiment enables members of an organization to access and maintain their own notification contact information directly, via a personal web page or other user interface. The members can input, update, and maintain their own contact information and can selectively designate the privacy level of their contact information, to selectively prevent the subscribing organization or others from viewing the member's contact information, such as the member's phone number. As described herein, the system further enables members to prioritize their contact paths and to have different priority contact paths for emergency and non-emergency notifications.

When children are involved, such as with respect to a school, camp, youth league or the like, or where other dependent and guardian relationships exist (for example, in retirement homes), embodiments of the system further provide the flexibility to accommodate and process notification with respect to multiple parent/guardian relationships to a child or other dependent, wherein different guardians can define different notification priority contact paths.

Further, embodiments of the present invention provide flexible and extensive administrative controls. In contrast to many conventional systems, an example embodiment of the notification system described herein enables a subscribing organization to exercise extensive control over the data of their organization via multiple access points, such as via the World Wide Web, a live operator, an IVR (Interactive Voice Response) system, an API (application programming interface), using conventional, as well as non-conventional, communication devices. Optionally, the system can be accessed by users on a substantially continuous basis via a variety of communication mediums. Advantageously, example embodiments enable an organization to control and manage its data and members directly via Web pages or telephone, without requiring manual intervention by the notification system operator. Further, embodiments of the system provide substantially real-time reporting of a notification broadcast result to the subscribing organization and its designated administrator or leader. The reports can, for example, be presented automatically and directly to authorized organization personnel via a Web page or the like. The report can specify who has been contacted, who has confirmed receipt of the contact, the date and time of the contacts and/or confirmation of receipt of the contacts, the medium used to communicate the contact, whom is still to be contacted, and/or who is unreachable.

Further, embodiments of the notification system enable members to be organized as groups or sets, thereby enabling the efficient issuance of notifications and enabling the distribution of administrative duties at a group or set level. Thus, example embodiments of the notification system enable organizations, and appropriate members, to create and define hierarchical groups, including groups, sub-groups, sub-sub-groups, and so on. By way of example, with respect to a school, a group can be a class grade, such as the fifth grade class, a sub-group can be the fifth grade class having Jane Doe as the teacher, a sub-sub group can be the male students in Jane Doe's class, and another a sub-sub group can be the female students in Jane Doe's class. By way of further example, with respect to a business, a group can be an accounting department, a sub-group of accounting can be accounts receivable, and a sub-sub-group can be collections. By way of still further example, a group can be a division, a sub-group can be a department, and a sub-sub-group can be a section. The groups can be created by the organization and authorized members or administrators without requiring manual intervention by the notification system operator.

Further, the notification system enables designated administrators to create leaders for a given group or sub-group. The leaders are then automatically provided with the "administrative capabilities" for his or her specific group or sub-group, or at other designated group level. Advantageously, administrative capabilities or rights of group leaders optionally can be assigned or revoked via a delegate authority function. The system optionally maintains audit trails and provides reports regarding when administrative capabilities or rights that were assigned or revoked, to whom the capabilities were assigned to or revoked from, and what level of administrative rights were assigned or revoked.

Additionally, the system can optionally provide broadcasts using conference call bridging, text-to-speech, and so on.

By way of illustration, in an example embodiment, during an emergency, a notification system can aid in crisis management and public safety by providing, rapid and accurate communication to an individual, to thousands of people, or other numbers of people. Thus, the system can, within a short duration, concurrently and continuously communicate via standard and non-standard message delivery devices including, by way of example and not limitation, a recipient's home phone, cell or wireless phone, work phone, pager, email, instant messaging, fax, Blackberry, SMS, instant messaging identifier, electronic chat identifier, wireless personal digital assistant, wireless laptops, and/or other terminals, until the message is received and/or confirmed as received by the intended recipient or recipients. For example, if a notification is broadcast via a PSTN (public switched telephone network) phone system, the notification system has 2,000 phone lines, and the notification message is 30 seconds long, then in 5 minutes 20,000 voice notifications can be provided, although other embodiments can have lower or higher notification rates. Further, email, SMS, or cell phone notifications can optionally be provided even at a much greater rate.

By way of further example, the notification system can also be used effectively for non-emergency, routine communications and general-purpose message broadcasting. By way of illustration, the notification system can centralize and speed notification distribution within businesses, schools, camps, alumni programs, the military, municipalities, hospitals, sales teams, and other organizations.

For example, when used by or on behalf of a school application, the system can provide a notification if something happens to a given child individually, or to the school as a whole. By way of illustration, if there is an early school closing due to an emergency or to bad weather, and the students need to be picked up, the system can notify in a short period of time, such as a few seconds or minutes, parents or parent-specified secondary or third level contacts if the parent cannot be reached. Further, the system can optionally provide a parent with a notification if an individual child is truant or absent to ensure that the parent is aware of the situation and can take the appropriate action.

By way of further example, with respect to the military, a commander can make a phone call or access a web site, and record a message to be delivered to the appropriate troops, and other or alternate target recipients if the system cannot successfully reach the troops directly. For example, the commander or other appropriate individual can issue a notification via the notification system to recall individual specialty teams, squadrons or divisions, with accurate message delivery logs provided to the commander or other designated personnel to verify that the notification was received.

Additionally, municipalities or other governmental entities can employ the notification system to communicate with on-call crisis personnel, such as volunteer firefighter, police, hazmat personnel, and/or emergency medical personnel. The notification system can further be used to provide the general population with warnings or evacuation directions. Further, the notification can selectively provide different notifications depending on the geographic location of the individuals, their handicapped status, the building type (wood, steel, concrete) that the individual lives or works in, and so on.

The notification system can further be used to manage and provide notifications on behalf of employers or businesses. For example, the system can provide terrorist related notifications, such as by alerting employees of changes to Homeland Security terrorist threat warning levels. The system can provide power blackout related notifications, such as by alerting employees customers and/or vendors. By way of further example, the notification system can provide one or more of the following example notifications:

Building evacuation messages: The system can relay notices to specific floors, buildings or entire campuses after major disasters (earthquakes, fires, domestic terrorism, etc.)

Weather alerts: Send emergency communications related to hurricanes, tornadoes, floods, lightening, wildfires, etc.

Personnel scheduling messages: The system can mobilize additional workers to meet demand, reschedule or cancel shifts, shut down facilities, etc.

Remote roll-calling: The system can verify safety and location of employees with active feedback feature (for example, the roll-call can instruct an employee to "Press 1 on your phone if you are at home; Press 2 on your phone if you are at the off-site facility", etc.).

Executive management communications: The system can disseminate critical information and status reports to senior executives or managers.

Activate response teams notification: The system can ensure rapid notification of security personnel and business continuity teams.

Routine and urgent notifications: The system can deliver office messages; contact security personnel, business continuity teams, and send follow-up emergency communications.

Thus, optionally, the notification system enables a subscribing entity or organization, in an emergency or non-emergency situation, to activate a notification process from a terminal, such as via a toll-free call from a touch-tone phone or via a computer terminal accessing a system notification Web page. Once activated, the notification process enables an organization to automatically provide one, thousands, or more people with an emergency notification in minutes. Those notified will optionally be contacted via their work phone, home phone, cell phone, pager, fax, e-mail, and/or instant messaging, Blackberry or PDA. When successful contact has been confirmed or has failed to be confirmed, a real time report of message receipt is optionally provided to the organizational administrator via fax, e-mail or online report. Confirmation of receipt of a notification message can be performed using a variety of techniques. In addition, for report purposes the system can store in the system database a notification identifier, who initiated the notification, the identity of the recipient user, how the notification was provided to the user, the date and time of the notification, and the date and time of the confirmation, wherein the foregoing are stored in association.

By way of example, if the notification is provided by the notification system to a user phone, the user will be instructed to press a selected phone key or speak a specified word or phrase into the phone, which, when provided, is detected by the notification system and the notification is marked as received or confirmed by that user in a system database. The user can also be instructed to send a confirming text message, such as an SMS message via a wireless phone or otherwise. If the notification is transmitted to a fax or one-way pager, the notification can instruct the user to call a specified phone number, such as a toll free number, and enter a code or the like to confirm receipt of the notification. If the notification is provided via email, the email may contain a link, such as a hyperlink, which when activated by the user, accesses a URL, and receipt of the notification is confirmed and the confirmation is stored in the system database. The email can also, or instead, instruct the user to confirm by sending a confirming email and/or calling a specified phone number.

The notification system can be provided via an application service provider (ASP), which hosts and operates the software, computers, telephone lines, data lines, and so on. Advantageously, because the ASP optionally provides notification services to many customers, the ASP generally does not require the maximum number of telephone lines or computers that might be needed for the worst case notification scenario for all customers or subscribing organizations at the same time. Thus, the ASP notification system can handle the worst case notification scenario for less than all of the customers with less telephone lines than the sum of all the lines that each of the ASP customers would, on an individual basis, need to handle the customer's individual worst case scenarios. The notification system can thus be accessed via a browser or client application executing on user computer terminal, via a telephone or the like.

Example embodiments will now be discussed with reference to the figures. As illustrated in FIG. 1, the example notification system 1 includes a web application server 104, a database server 106 hosting a RDBMS database and/or other data store, a telephony server 108, and an email server 110. The system may further be coupled to a third party messaging service 130, which can be, by way of example, a wireless service provider, a pager service provider, an email service provider, and so on, which in turn may relay notifications from the notification system to the targeted terminals.

As illustrated, the application server 104 is coupled to the database server 106, the telephony server 108, the email server 110, and optionally one or more third party messaging services 130. The web application server 104 can include an application server and a Web server, and can host a Web site accessible to users to manage notification groups, issue notifications, enter contact information, enter contact priorities, view reports, and so on. In addition, the web application server 104 can maintain or include a notification queue that includes notifications to be sent out in a designated order or with associated priorities. The server 104 is optionally a secure server with SSL encryption to ensure data security during transmission between client browsers and the server 104.

The database server 106 can include or store organization and member account information, such as account identifiers, user identifiers and passwords, user contact information, contact path prioritizations, permitted contact methods on an organization or group level, authorization codes, prerecorded notifications, audit trails, records of notifications (such as notification identifiers, titles, initiator name or identifier, starting date and time, stop date and time, the identities of users which confirmed receiving the notification, the identities of users who failed to confirm receipt of the notification, the identities of users that were unreachable, the method used to provide or attempt to provide the notification for each user), reports, group identifiers, group member information, administrator identifiers, administrator authorization levels, other data and information discussed herein, and so on. Information or selected sensitive information, such as passwords, are optionally stored in an encrypted format.

Optionally, a geographic information system (GIS) server 132 is coupled to a database 134 which can include or store a reverse 911 database. As is understood by one of ordinary skill in the technical field, a reverse 911 database is used to identify and access phone numbers in a particular or selected geographic area and is often used by governmental and other entities to contact people in an emergency. For example, phone numbers can be stored in association with corresponding addresses, zip codes, and/or other location related information. Using a zip code or address as a search key, searching the reverse 911 database will locate the corresponding phone numbers. The reverse 911 database may be a database that includes publicly available and unpublished phone numbers, fax numbers, and/or pager numbers. The reverse 911 database for a given municipality is optionally accessible to those who contract for access with the municipality. For example, if a gas leak occurs and a city wants to evacuate a given geographical area, such as an area within a certain radius around the gas leak, the notification system will also call each of the user's contact paths, such as home phone number, cell phone number, work phone number, etc., stored in the database server 106 database until a "notification received" confirmation is provided to the notification system. For those in the selected area that are not members or registered users of the notification system, the notification system can access over a network the reverse 911 database 134 or other electronic directory listing, such as might be obtained from a phone company. The notification system can provide notifications to such non-registered persons via the phone numbers obtained from the reverse 911 database 134 or other electronic directory.

The notification system enables an organization to build a database of members through add and manage processes, to distribute unique authorization codes to members through which they can register themselves, to select or provide registered users with passwords and/or user identifiers, to specify the notification and notification report delivery methods, to create and define groups of members, to send emergency and/or standard notifications to selected members/groups, to receive results or confirmations of the notifications, and to track notifications and broadcast history. For example, a user can specify the communication methods to be used by the system 102 to provide the user with notifications, as well as the order of use of the communication methods.

By way of illustration, the user can specify various phone numbers, fax numbers, instant messaging identifiers, and/or email addresses with associated communication priorities for emergency and/or non-emergency notification. By way of further illustration, a user can provide a work phone number, a mobile phone number, and a home phone number and can specify that the system 102 should first attempt to provide an emergency notification to the mobile phone number, if that attempt is not successful, to attempt to provide the emergency notification to the work phone number, and if that attempt is not successful, to attempt to provide the emergency notification to the home phone number. By way of further illustration, a user can specify that for non-emergency notifications, the system 102 should first attempt to provide the non-emergency notification to the home phone number, if that attempt is not successful, to attempt to provide the non-emergency notification to the work phone number, if that attempt is not successful, to attempt to provide the non-emergency notification to the home phone number, and if that attempt is not successful, to attempt to provide the non-emergency notification to the mobile phone number.

The notification system 102 can be accessed by users/members, including administrators and those on broadcast notification lists. For example, users can access the notification system 102 by using a user computer terminal 112 to access the web application server 104. The computer terminal 112 can include a network interface, and can access the web application server 104 over the Internet or other network. The web application server 104 can generate forms and other user interfaces that are presented to the user via a browser executing on the computer terminal 112, or otherwise. For example, the browser can generate HTTP requests which received by the Web application server 104 which in turn transmits the appropriate Web page in the form of HTML or otherwise for presentation to the user via a terminal display. Users can further access the notification system 112 and functions provided by the notification system, via an API, by telephone 114 via the telephony server 108, or via a live operator 136.

The example telephony server 108 includes one or more telecommunication processors, one or more digital voice resource/network interface circuits, and one or more digital fax resource circuits and can interface to a telephone network, such as a PSTN system. The telephony server 108 can transmit notifications to, and receive notification confirmations from a work phone 116, a cell phone 118, a home phone 120, a pager 122, a fax 124, as well as other telephony terminals. In addition or alternatively, notifications can be provided to, and confirmations received from an email terminal 126, such as, by way of example, a personal digital assistant 128. One or more of the foregoing terminals, such as the cell phone 118, the pager 122, the email terminal 126, and the PDA 128 can be connected to the notification system via the third party messaging server 130.

Optionally, the telephony server 108 further includes a text-to-speech or speech synthesis software and/or electronic module which can, for example, translate text notification messages into voice messages to be broadcast to telephones, mobile phones, and so on. The text-to-speech or speech synthesis module can instead, or in addition, be provided via another server, such as the application server 104. By way of example, the notification text can include alphanumeric and/or other characters. Further, notification reports, providing information on to whom notifications have been provided, by what means, and whether a notification confirmation was received, can be generated by the web application 104 and transmitted to user devices 112, 114, 116, 118, 120, 122, 124, 126 and/or 128.

For example, when a notification broadcast is initiated by an administrator or otherwise, the web application server 104 transfers the broadcast details to the telephony and email servers 108, 110 as per the recipients contact paths retrieved from the database associated with database server 106. The telephony and email servers 108, 110 will then accordingly broadcast the notification and store the results to the database associated with server 106. The web application server 104 will automatically, or in response to a user request, generate a report which is provided to the administrator or other designated recipient.

In particular, a notification can be a voice, video, text, fax, and/or image message that is sent out by the notification system 102 on behalf of a subscribing organization to selected members, groups of the organization. By way of example, the organization can be a business, school, camp, club, the military, a municipality, a township, a hospital, or other organization. Different types of notifications can be assigned different priorities. For example, there can be notifications designated as standard notifications, and notifications designated as emergency notifications. Notifications designated as emergency notifications can be broadcast substantially immediately and can take precedence over standard notifications (not designated as emergency notifications) in a notification queue. A standard notification can be scheduled for broadcast at a given date/time, such as at a future date and/or time that can be minutes, hours, days, weeks, or months in the future.

As previously discussed, embodiments of the notification system 102 optionally enables organization members, such as employees, parents, other members, to enter their contact data, such as a member's work phone number, assistant's phone number, work fax number, work e-mail address, home phone number, cell phone number, pager number, home fax number, home e-mail address, instant messaging identifier, Blackberry number, and so on, themselves. This data entry system can improve contact data accuracy, simplify data maintenance, and can reduce organization's costs and as well as liability by the contact information task from their line of responsibility and instead assigning it to their member's.

Optionally, a unique authorization code is generated by the system 102 or otherwise, for each member. A selected or designated organization leader or administrator distributes the authorization code to unregistered members, such as by email, hardcopy letters, by phone or otherwise. The members can then use the authorization code to register themselves with the notification system 102 and enter and setup their contact information.

Similarly, each member is optionally provided with a numeric or alphanumeric identifier to be used for logging onto the system. The user can further specify a password. Optionally, because a user may be a member of several organizations that utilize the notification system, such as via their employer and their child's school, to avoid having multiple identifiers, the user can be provided with the option to use the same identifier for log in purposes for multiple organizations. Once logged in, a list of organizations that the user is member of and that utilize the notification system can be presented to the user, and the user can select the organization he/she wants to work with, such as by updating contact information, path priorities, or issuing notifications.

As discussed above, users can be assigned different administrative or leader roles by their organization or an organization member with the appropriate authority. Example roles will now be described, however other roles, and other role titles, can be used as well.

An organization leader (referred to herein, for convenience, as an "org leader") is the main or a top tier authorized administrator for a subscribing organization. In an example embodiment, an organization leader is provided access to all of the notification system features or functions (such as administrative, notification, and reporting functions and features) made available to the corresponding subscribing organization. Optionally, an org leader can delegate all or a selected portion of the org leader's authority to another member of the organization. If the org leader has delegated full authority to another member, that member is provided access to all the features of the org leader. Example org leader functions will be described below.

For ease of management in large organizations, member groups may be created by an org leader. The org leader, or a member with appropriate delegated authority, may designate one or more members of a group to be the group leader of a selected group. A group leader can perform maintenance tasks on the leader's group and can optionally be provided the ability to initiate or send notifications to their group members via the notification system. Example group leader functions will be discussed below.

Generally, registered users of an organization have a "member" role. The member role enables the users to login to the notification system 102 and enter and update their profile, contact information, delivery paths priorities, and so on, but, unless they also have a higher level role, generally cannot administer other users and can be denied the ability to send notifications. Example member functions will be provided below. The notification system 102 may further have technical administrators to maintain the system software and hardware.

The following table provides example functions and access rights available to corresponding example roles, such as the roles of org leader, group leader, and member. A user will be able to execute/access menu items if the user's current role has access privileges to the corresponding function. However, different functions, access rights and/or combinations thereof can be provided as well. Further, fewer or more roles can be defined and assigned desired access rights.

to the entire participating organization, while the group leader has access rights with respect to the group leader's group and sub-groups. An org leader can issue notifications up to an entire organization, while a group leader can issue notifications to the leader's group and sub-groups. Similarly, org leaders and group leaders can initiate emergency or standard conference calls, while an ordinary member is not given such rights in this example. An org leader can initiate conference calls up to an entire organization, while a group leader can initiate conference calls with members of the group leader's group or sub-groups.

With respect to managing broadcasts, org leaders and group leaders can manage messages, track active broadcasts, and view broadcast histories, while in this example an ordinary member is not given such rights. Further, with respect to adding and managing members, in this example an org leader can add members to the org leader's organization with respect to the notification system, while group leaders and ordinary

|  |  | Access Rights | | |
| --- | --- | --- | --- | --- |
| Menu Item | Function | Org Leader | Group Leader | Member |
| Notifications | | | | |
| Send Notification | Send an emergency or standard notification | ✓ | ✓ | ✗ |
| Send Conference Call | Initiate an emergency or standard conference | ✓ | ✓ | ✗ |
| Manage Broadcasts | | | | |
| Manage Messages | Manage scheduled messages, or pre-record messages | ✓ | ✓ | ✗ |
| Track Active Broadcasts | View currently active broadcasts, live results and stop an active broadcast | ✓ | ✓ | ✗ |
| View Broadcast History | View/Search sent broadcasts, broadcasts results | ✓ | ✓ | ✗ |
| Members | | | | |
| Add Members | Add new members to the organization | ✓ | ✗ | ✗ |
| Manage Members | Manage details of a selected member including personal/contact info, registration information, groups, plan enrollment, etc. Also perform operations such as remove/reactivate on multiple members. | ✓ | ✗ | ✗ |
| Distribute Authorization Codes | Send authorization codes to members via email or by printing out letters. | ✓ | ✗ | ✗ |
| Groups | | | | |
| Add Groups | Create a group. | ✓ | ✗ | ✗ |
| Manage Groups | Add/remove members, leaders to groups. | ✓ | ✓ | ✗ |
| Reports | | | | |
| Standard Reports | Get predefined reports on participating members and broadcasts. | ✓ | ✓ | ✗ |
| Ad-hoc Reports | Generate ad-hoc reports on members, broadcasts, groups etc. | ✓ | ✓ | ✗ |
| Admin | | | | |
| Manage Delivery Methods | Add/remove allowed notification delivery methods for the organization. | ✓ | ✗ | ✗ |
| Record Greetings | Record emergency/standard greeting messages. | ✓ | ✗ | ✗ |
| Member Profile | Manage contact information, personal information, and login information. | ✓ | ✓ | ✓ |
| Delegate Authority | Allow an Org Leader to provide org leader rights to a member of the organization. | ✓ | ✗ | ✗ |
| View Invoices | View/Print invoices generated for the organization. | ✓ | ✗ | ✗ |
| Select Organization | Allow the user to select the current organization if the user is subscribed for multiple organization | ✓ | ✓ | ✓ |
| Member FAQs | | ✓ | ✓ | ✓ |

With reference to the example table above, org leaders and group leaders can issue or initiate emergency or standard notifications, while an ordinary member cannot. With respect to the access rights, the org leader has the rights with respect members are not given such rights. Similarly, in this example an org leader can manage members of the org leader's organization, such as by assigning members to groups, removing members from groups, delegating authority to selected members, and/or editing member information, while group leaders and ordinary members are not given such rights. An org leader can distribute authorization codes to allow users to access the notification system as a member of the org leader's organization, while group leaders and ordinary members are not given such rights.

Further, with respect to groups, in this example an org leader can create or define new groups, while group leaders and ordinary members are not given such rights, though a group leader can create sub-groups that are lower in the hierarchy to the group leader's group. An org leader and a group leader can add or remove members and or designate group leaders, while ordinary members are not given such rights. In this example, a group leader can only add or remove members to the group leader's group and/or sub-groups, and can only designate a group leader for the group leader's group and/or sub-groups. In addition, in this example, an org leader and a group leader are able to request or receive standard or custom reports.

In this example, an org leader can add or remove notification delivery methods for the org leader's organization, while group leaders and ordinary members are not given such rights. Additionally, in this example, only the org leader can record notifications. In another example, org leaders and group leaders have the ability to record notifications. In still another example, org leaders, group leaders, and ordinary members can record notifications.

In addition, org leaders, group leaders, and ordinary members can manage and edit their own profile, including contact, personal, and login information. With respect to delegation of authority, in this example, an org leader can delegate the org leader's access and management rights, while a group leader and ordinary member is not given such rights. Optionally, a group leader can be provided the right to delegate the group leader's role to a member of the group. The org leader is provided with access to the org leader's organization's invoices, with group leaders and ordinary members are not. An org leader, group leader, and ordinary member can select the current organization they want to deal with if the org leader, group leader, or ordinary member is a member of more than one organization that utilizes the notification system. An org leader, group leader, and ordinary member can also view help files and frequently asked questions (FAQs).

As previously discussed, a user can specify a variety of contact paths and associated priorities with respect to notification transmissions to the user. A work phone number, assistant's phone number, work fax number, work e-mail address, home phone number, cell phone number, pager number, home fax number, home e-mail address, instant messaging identifier, Blackberry number, and so on, are examples of contact paths. When members register, they are requested to enter information for their different contact paths along with the priority of the contact path, which are then stored in the database associated with server 106.

By way of example, a user may enter the user's mobile phone with priority 1 and home phone with priority 2. When a notification is broadcast, the message will first be sent to the user's mobile phone. If the user does not confirm receipt of message or the mobile phone is unavailable, the message will be sent to the next contact path in priority, the home phone in this example. The system will attempt to contact the user via each of the contact paths specified by the user until the user is reached. Thus, the system provides a high likelihood of quickly reaching a recipient with a message notification in minimum amount of time. Optionally, the notification system enables the organization to select default contact paths and priorities for the organization's members that may be used for delivery of messages or notifications to members. For example, the organization, via the org leader, can specify that notifications or messages are first to be transmitted to members' mobile phones, then to members' home phones, and then to members' work phones. Members can then optionally be allowed to change the contact paths and/or priorities.

Figure 2A:
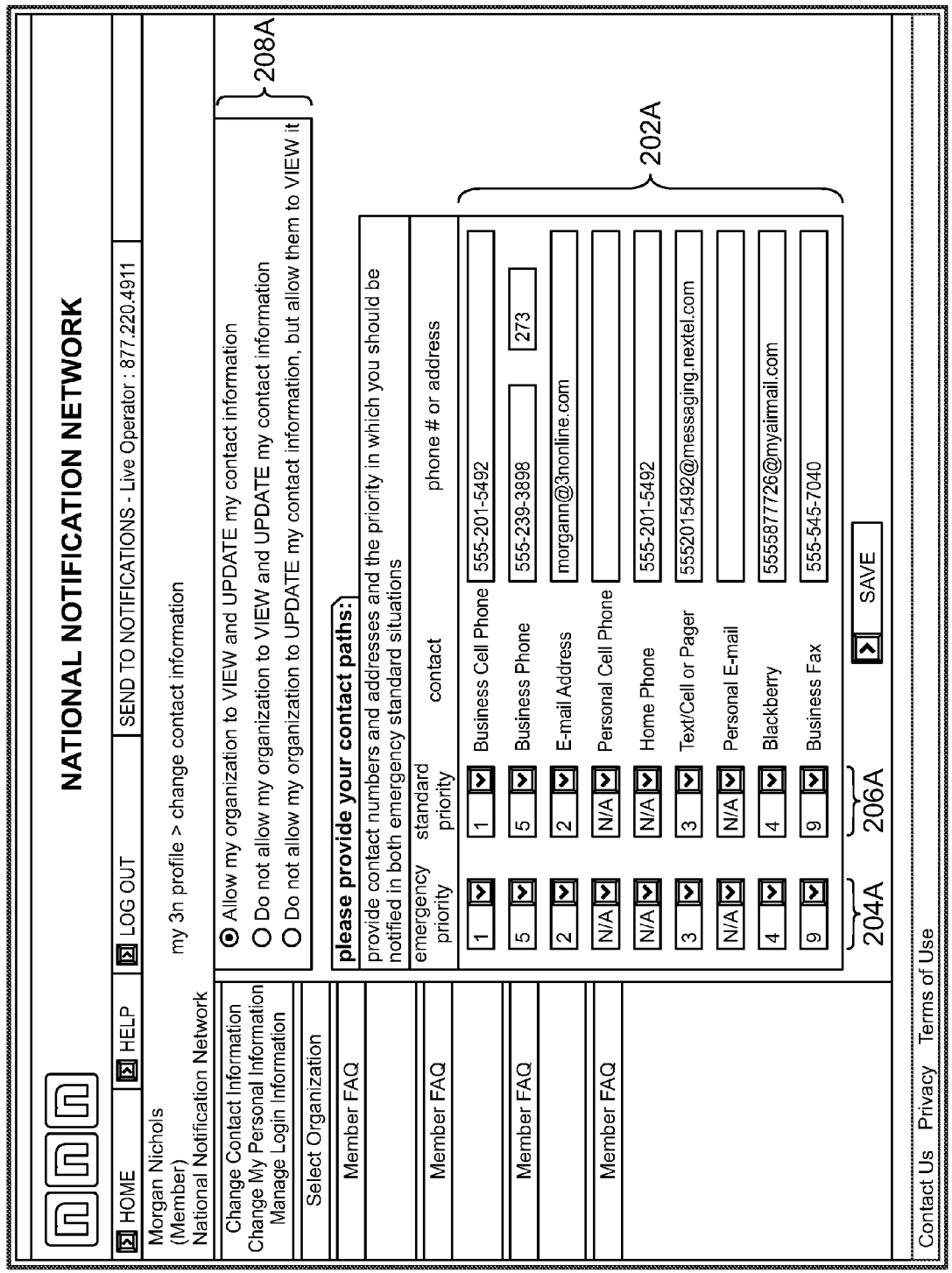

FIG. 2A illustrates an example user interface for entering contact paths and assigning corresponding priorities. The user interfaces described herein can be in the form of a Web page, such as one generated using one or more of HTML, Java, JavaScript, ActiveX, or using other languages or standards, that will be displayed in a user browser or other client program. In addition, data and messages received via the user interfaces are stored in one or more databases or other data stores, such as that hosted by database server 106.

With respect to FIG. 2A, users can specify different contact paths and priorities for standard (non-emergency or non-urgent) notifications and emergency or urgent notifications. The user can directly enter the contact paths and priorities, without requiring someone else to manually enter such information. For example, the user can later directly edit or modify the contact paths and/or priorities, without requiring manual intervention by another.

For example, the interface includes contact entry fields 202A used to enter contact paths, such as phone numbers (such as home, work, or international or travel phone numbers), pager numbers, fax numbers, email addresses, and so on. In addition, for each contact path, the user can set a priority, such as a numerical or alphabetical priority, separately for emergency notifications 204A and standard notifications 206A. The user can also specify if a contact path is not to be used to send notifications to the user by selecting or entering a "not applicable", "N/A", or similar designation. During a notification broadcast, the system optionally will attempt to contact the user in the order specified by the priority designation. Optionally, once the user confirms that the notification has been received, the system will not continue to broadcast the notification to the user.

To protect the user's privacy the user can select different levels of privacy and access with respect to the user's organization. For example, as illustrated in FIG. 2A, the user can specify via privacy options 208A whether the user's organization is to be allowed to:

a. view and update or edit the user's contact information b. view, but not update or edit the user's contact information c. do not allow the organization to view or update the user's contact info This user interface, as well as other user interfaces, optionally includes the current user's name, the user's role with respect to the notification system (for example, "member," "group leader", or "org leader"), and the user's organization name. The user may have been earlier requested to provide, for storage in the system database, the user's name, address, email addresses, home, work, and cell or mobile numbers, create a password, select a password reminder, and select an alpha or alphanumeric alias for an automatically generated numerical user identifier.

Further, as previously discussed, when children are involved, such as with respect to a school, camp, youth league or the like, or where other dependent and guardian relationships exist (for example, in retirement homes), embodiments of the system further provide the flexibility to accommodate and process notification with respect to multiple parent/guardian relationships to a child or other dependent, wherein different guardians can define different notification priority contact paths. For example, with reference to FIG. 2M, a member can specify their role with respect to a child or dependent, such as parent, grandparent, step-father, step-mother, and the like as well provide their contact information, such as name, address, email address, and so on. The user can also later update or edit the information provided via this form.

An example notification process will now be described with reference to FIG. 3. As will be discussed, the notification process enables a user to select or generate a notification distribution list, create notification messages, select delivery methods, and schedule deliveries of notifications.

At state 302 a send notification process is initiated. For example, a user can select a send notification command via a link, menu selection, or otherwise. At state 304, the user/notification initiator, such as an org or group leader, selects the type of notification or message. In this example, the user can initiate sending a standard or routine (non-emergency) message, an emergency message, initiate a standard conference, or initiate an emergency conference via a notification initiation user interface. An example notification initiation interface is illustrated in FIG. 2B. The notification initiation interface is, in this example, visually separated into "send a notification" and "initiate a conference call" functions. Each function has two buttons or links, an emergency broadcast button and a standard broadcast button.

Figure 2C:
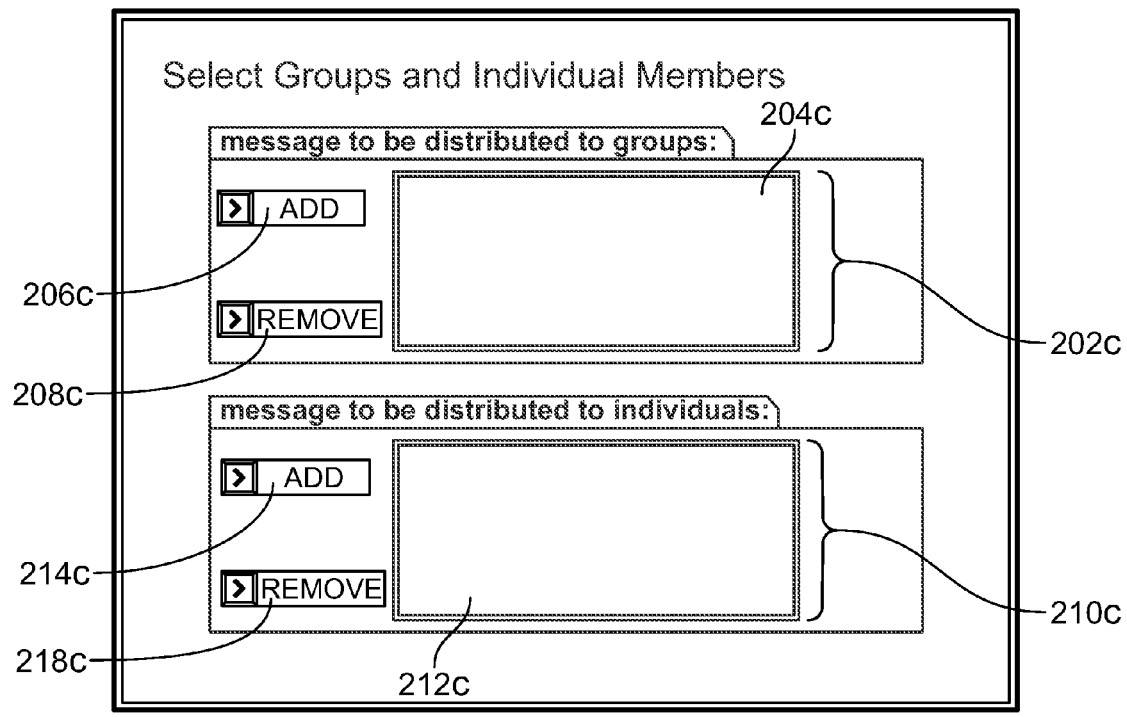

If the user selects the send a standard or emergency message button, the process proceeds to state 306, where the user can specify the distribution for the message, such as by selecting one or more groups and/or individuals to whom the message is to be communicated to. FIG. 2C illustrates an example user interface via which a user can select groups and/or individuals to whom the message is to be communicated to. As illustrated, the user interface includes a group list box 202C, used to display groups selected to receive a notification message, and add and remove buttons 206C, 208C used to remove or add groups to the group list box 202C. In an example embodiment, user activation of the add button 204C causes the process to proceed to state 312, where a "select groups" interface is displayed via a pop-up window or otherwise, an example of which is illustrated in FIG. 2D.

Figure 2D:
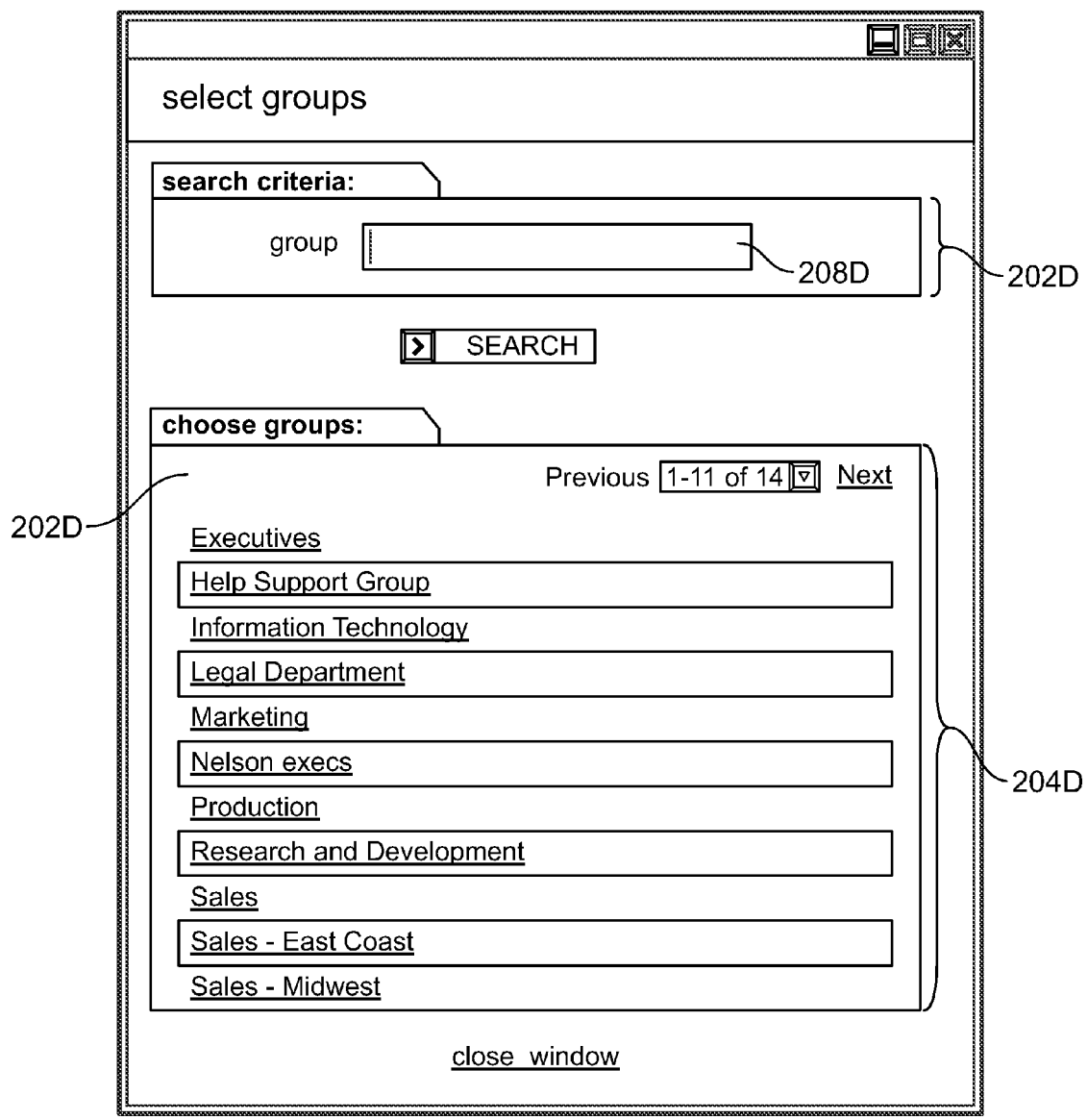
Figure 2F:
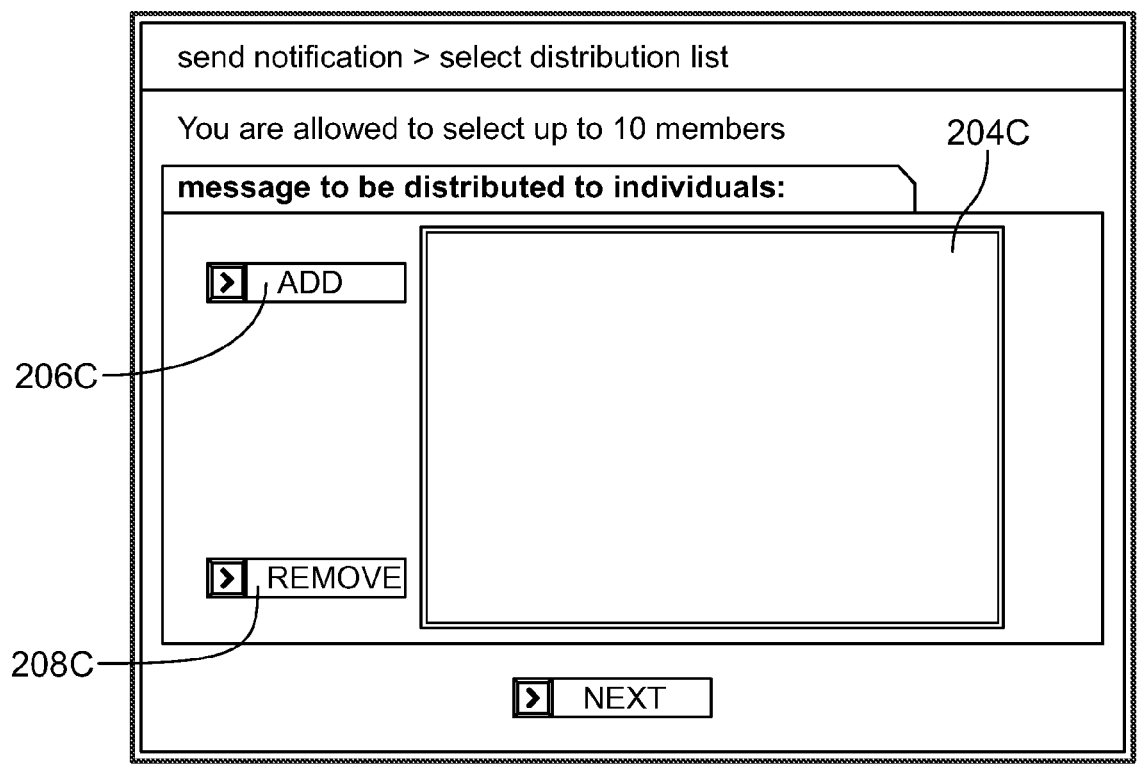

The select group interface, such as that illustrated in FIG. 2D, displays group names or identifiers, and enables the user to browse or search for group names, that the user can add to the group list box 202C illustrated in FIG. 2C. Activation of the remove button 208C will remove the currently selected group(s) from the group list box 202C, and hence, those groups will not receive the notification message.

Similarly, an "individual" list box 210C is provided and is used to display the names of individuals selected to receive a notification message, and add and remove buttons 214C, 218C used to remove or add individuals with respect to the individual list box 210C. In an example embodiment, user activation of the add button 214C causes the process to proceed to state 310, where a "select individuals" interface is displayed via a pop-up window or otherwise, an example of which is illustrated in FIG. 2E.

With respect to FIG. 2D, the example select groups interface has a search criteria functional area 202A and a search results functional area 204D. When the select groups interface is launched or opened, the interface displays a list of the groups 206D the current user has access to. The list may be in alphabetical order, in order of the most recently used groups, or in some other order, wherein the order is optionally selectable by the user. In this example, an org leader has access to all "groups" of the leader's organization. A group leader can access the group he/she is the group leader of, and in addition, groups or sub-groups created by the group leader. The search criteria area includes a group search field 208D, wherein a user can enter in a search string including all or a portion of a group name. In addition, the user may use wildcards in conjunction with a partial group name. The search process will then replace the previously displayed list of groups with a scrollable list of search results. In an example embodiment, the search results includes group names in the form of hyperlinks. Clicking on a group name will add the group to the group list box 202C illustrated in FIG. 2C. Optionally, the search results will be filtered or limited to display only those groups with whom the user has the right to send notifications to.

FIG. 2E illustrates a similar interface used to select individuals to the notification message recipient list. When the select individuals interface is launched or opened, the interface displays a list of names of members 202E the current user is authorized to send notifications to via the notification system. The list may be in alphabetical order, in order of the mostly recently notified members, or in some other order, wherein the order is optionally selectable by the user. In an example embodiment, an org leader has access to all members of the org leader's organization. A group leader can select individual members of the group leader's group or sub-group. A search criteria area includes input fields for a first name 204E and a last name 206E. The user may enter values in either or both of the fields 204E, 206E to search for a member or for members. Wildcards may be used to search by entering a search string including a partial name. The search process will then replace the previously displayed list of members, with a scrollable list of search results. In an example embodiment, the search results will include member names in the form of links. Clicking on a member name will add the member to the list box 210C illustrated in FIG. 2C. Optionally, the search results will be filtered or limited to display only those members with whom the user is authorized to send notifications to via the notification system.

Referring back to FIG. 3, if, at state 304, the user elected to initiate a standard or emergency conference call, the process proceeds to state 308, wherein the user selects individuals who will be asked to participate in the conference call. As similarly described above with respect to FIG. 2C, an "individual" list box 202F, used to display the names of individuals selected to receive a conference call notification message, and add and remove buttons 204F, 206F used to remove or add individuals with respect to the individual list box 202F. In an example embodiment, user activation of the add button 204F causes the process to proceed to state 310, where a "select individuals" interface is displayed via a pop-up window or otherwise, an example of which is illustrated in the previously discussed FIG. 2E. In another embodiment, a user can also select on a group level which groups are to be requested to join the conference call.

Once the recipient groups and/or individuals have been selected, the process proceeds to state 314, where a text and/or notification message is entered or recorded and/or a previously recorded message is selected for use in the notification. Optionally, if a user enters a message as a text message using a keyboard or the like, a text-to-speech module translates the text into a voice message, to allow the message to be broadcast as both a voice message to telephones and the like, as well as a text message via email, SMS messaging, facsimiles, instant messaging applications, electronic chat applications, and so on. Thus, optionally, the user issuing the notification does not have to enter the same message several times using several different interfaces in order to broadcast a notification message to both voice-type terminals, such as phones, and text-type terminals, such as SMS or email terminals. Therefore, optionally, a single notification insert can be transmitted to a variety of different terminal types.

Figure 2G:
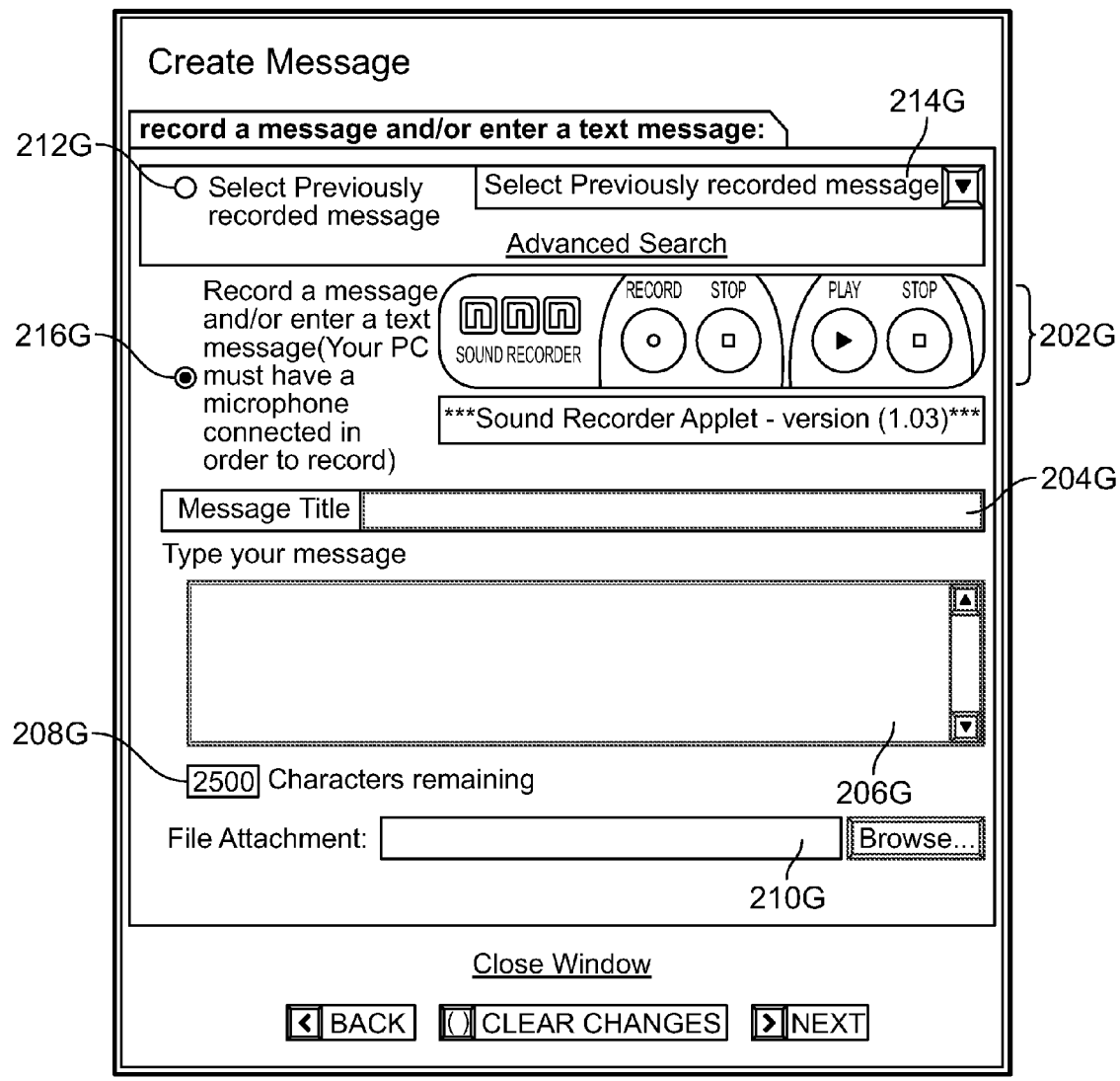

With reference to the message creation interface illustrated in FIG. 2G, a Java applet or other code is optionally embedded in a message creation Web page to provide functionality for recording a message through a microphone included in or attached to the user's computer or other appropriate terminal being used to access the notification system. Optionally, a video message can be recorded as well, such as by using a Web cam or other camera coupled to the user's computer or other appropriate terminal.

In the illustrated example embodiment, the applet provides control buttons 202G for Record, Stop Recording, Play and Stop Playback. A title field 204G is provided wherein the user can enter a title for the notification. An input field 206G receives a user entered text message. Optionally, the length of the text message is limited to a certain number of characters, such as, by way of example, 2500 characters. As the message is typed in, the number of characters remaining is optionally displayed in field 208G. The user can optionally include or upload a file to be sent as an attachment with the message for email deliveries by entering in the file name into file attachment field 210G or otherwise selecting the file for attachment.

The recording controls are optionally not enabled and/or not displayed, unless the user has selected the record a message option 216G. Clicking the record button will start the recording which will continue until the stop button is pressed or for a maximum predetermined period of time. The user may use the play button to playback and review the recording, or activate the record button again to record over the current recording.

If the user selects the "select previously recorded message" option 212G, a list box 214G or other interface displays the titles of previously recorded messages available to the user. User selection of a title retrieves the selected message from the system database and optionally causes the display of message information, including the message title and message text, if any. The user can activate a play button to playback a previously recorded voice and/or video message. The previously recorded message title and message text are optionally editable by the user.

Optionally, a message search page can be accessed via a link or menu which enables a user to search for a previously recorded and/or broadcast notification message. An example search messages page is illustrated in FIG. 2H. When a user first accesses the search messages page, a search results area 202H optionally lists all messages available to the user in accordance with the user's access rights. For example, for a group leader the listed messages will be those previously recorded and/or broadcast initiated by the group leader and/or by a group leader delegate. For an org leader, optionally the prerecorded and/or broadcast messages for the organization will be listed.

As illustrated, the search messages page includes search fields for message title, initiator's first name, initiator's last name, and start date. The user can enter search strings into one or more of the fields. Upon activation of a search button, the system searches for and locates corresponding results located in the system database, which are then displayed in a query results area. The search results include, in column format: Message Title, Initiated By, Start Date and Has Voice, though other columns and column titles can be used as well. The "Has voice" column includes an indication, such as a "V", for messages which include an associated voice recording. Similarly, a "have Video" column can be provided (not shown) that indicates whether a message has an associated video message. In response to a user clicking on or otherwise selecting a message title or identifier, the system will cause the create message interface to be displayed on the user terminal, such as the message creation interface illustrated in FIG. 2G, and will load the selected message.

Figure 2I:
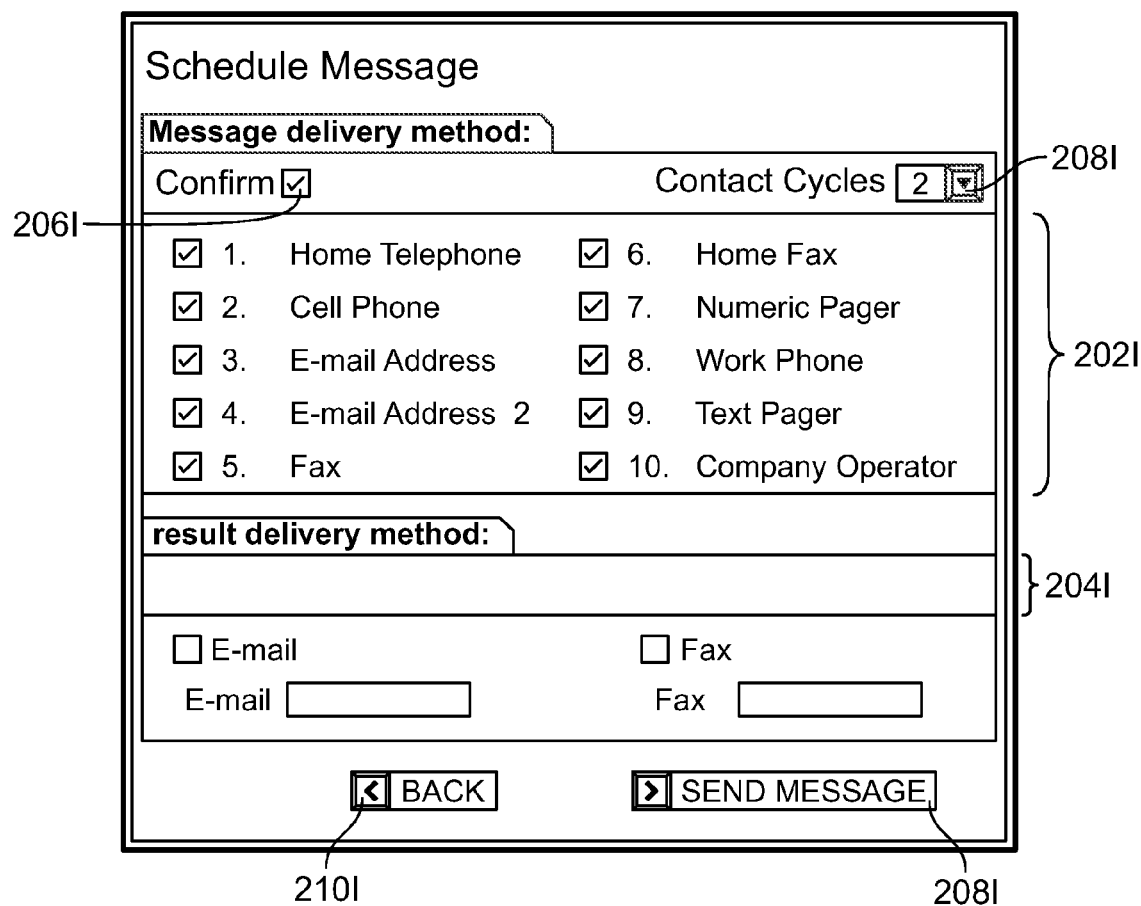
Figure 2J:
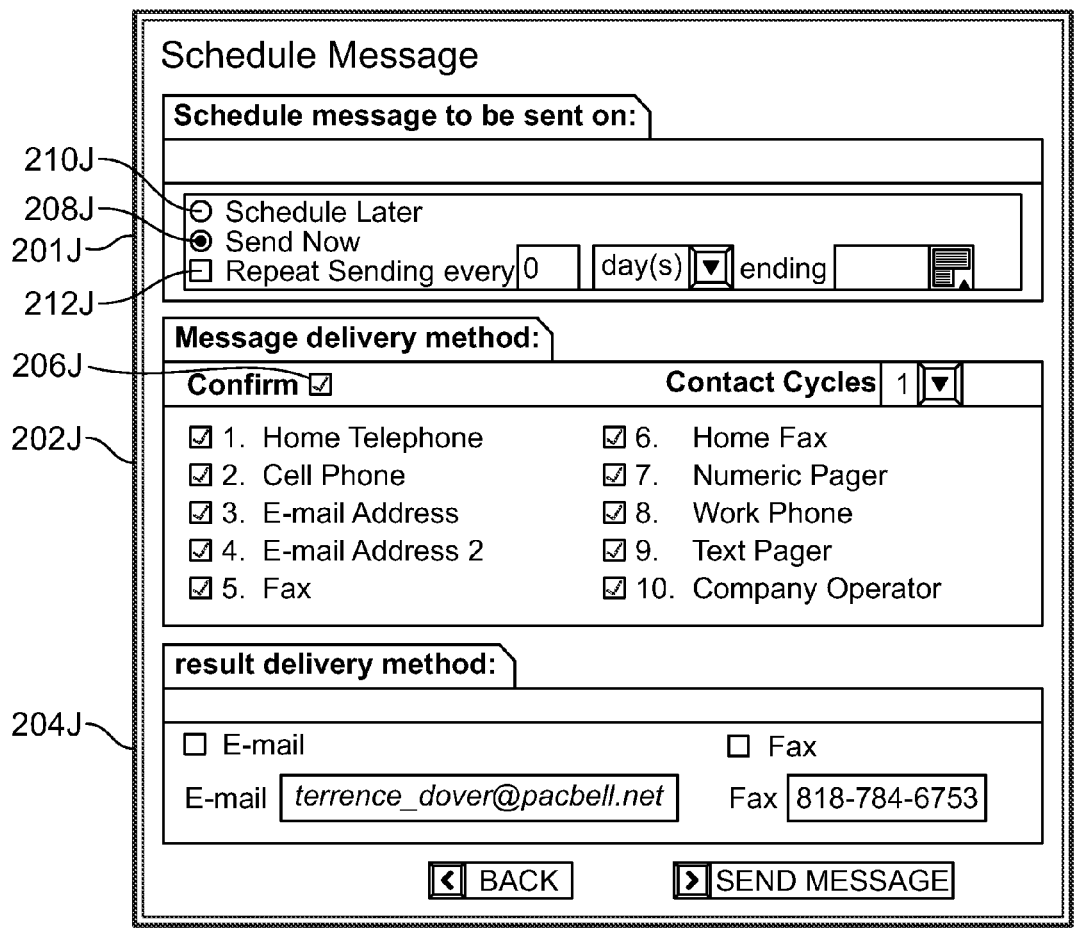
Figure 2M:
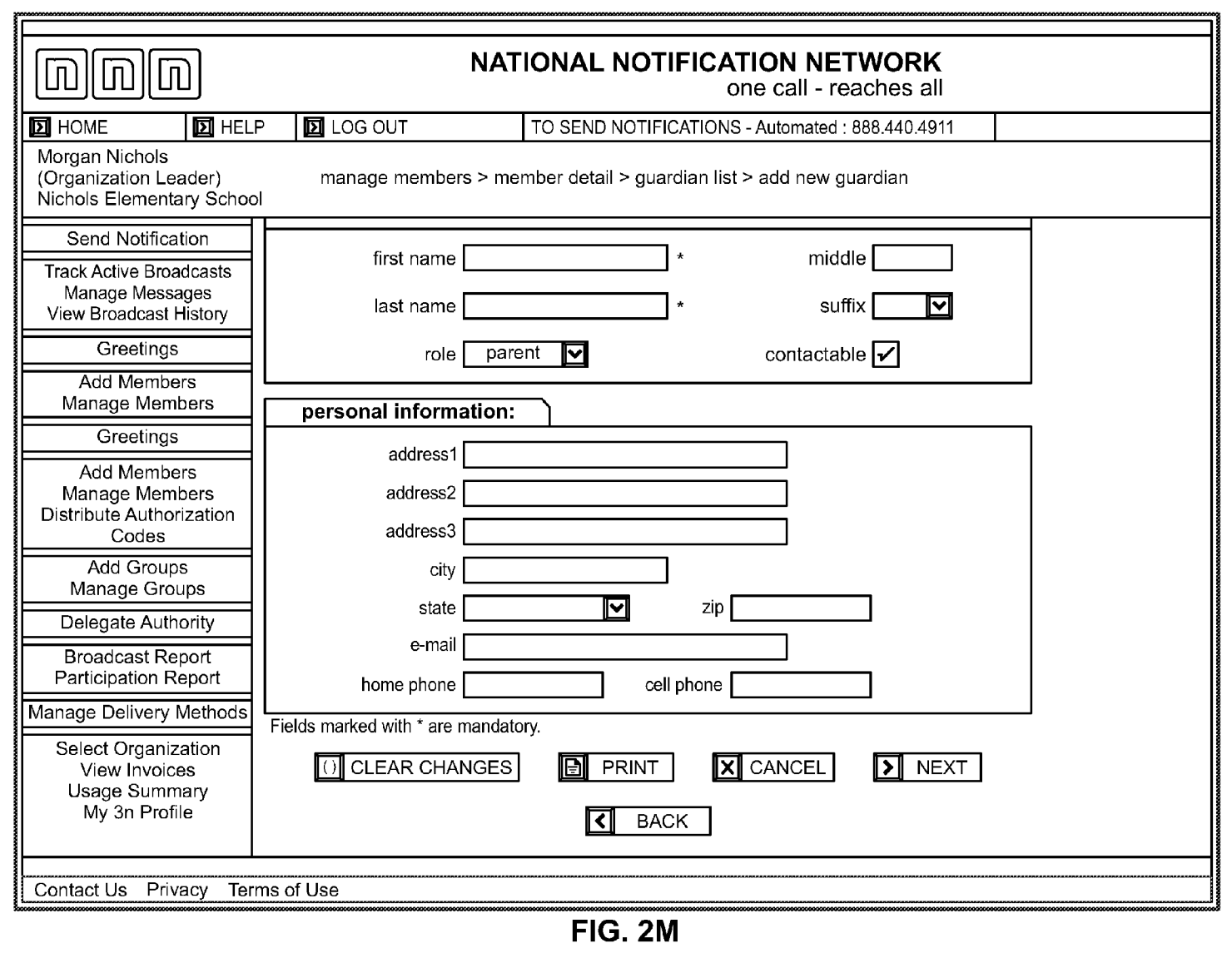
Figure 3:
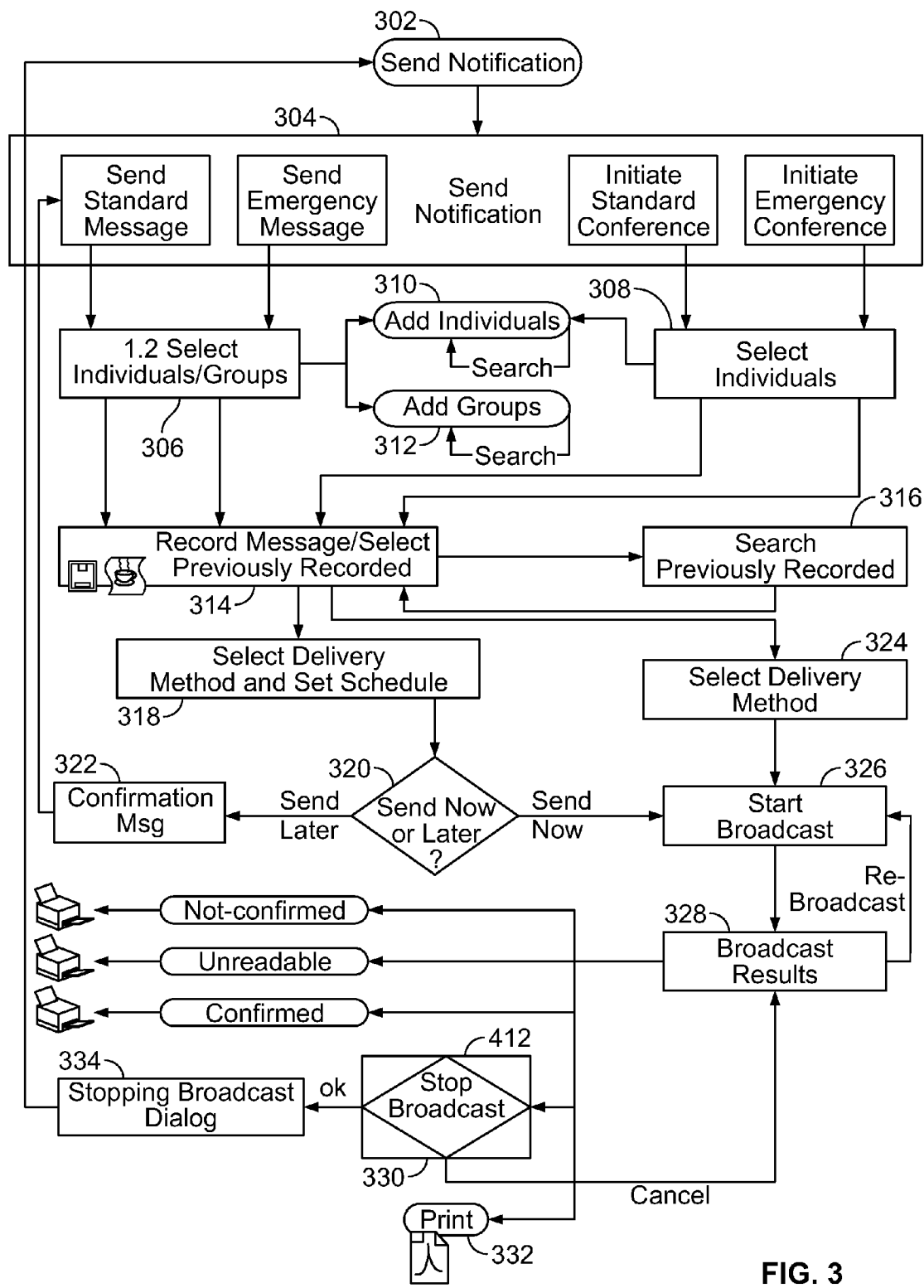
FIG. 3 illustrates an example notification process.

Referring to FIG. 3, once the message is recorded or selected, the process proceeds to state 318, for non-emergency notifications, where the user selects the message delivery method and/or schedule via a select method/schedule user interface for non-emergencies, such as that illustrated in FIG. 2J, or to state 324, for emergency notifications, where the user selects the message delivery method via a select delivery method such as that illustrated in FIG. 2I.

The interface illustrated in FIG. 2I includes a select message delivery method area 202I and a select result delivery method 204I for emergency notification or conference call. With respect to select message delivery method area 202I, a variety of delivery methods, previously defined as available or appropriate by or for the corresponding organization, are presented with associated selection checkboxes. In this example, the user can select one or more of home telephone, cell phone, work email, home email, fax, home fax, numeric pager, work telephone, text pager, and company operator. Another organization may only authorize use of one or more of home telephone, cell phone, and work telephone, by way of example. The user can select or deselect the delivery methods or targets that a message would be delivered to. A "Confirm" check box 206I is provided. If checked or otherwise selected by the user, a receipt confirmation will be sought or requested from the message recipients. Optionally, by default, the confirm check box is selected.

The user may also select the number of contact cycles that will be performed by the notification system via a contact cycles field 208I. In particular, the user can specify how many times the system will cycle through the contact paths in trying to contact members before halting. Optionally, a maximum number of contact cycles can be specified by the organization, such as 5 or 10 cycles.

The user can specify, via the result delivery method area 204I, the delivery method to be used by the system to deliver results of the notification broadcast. For example, the user can specify, by selecting a corresponding checkbox or otherwise, that broadcast results are to be delivered to a fax number and/or an email address. Fields are provided in which the user can an email address and fax number to which the results are to be transmitted to.

Referring still to FIG. 2I, a Send Message button 208I is provided, which, when activated by the user, such as at state 326 in FIG. 3, will cause the emergency notification message to be broadcast substantially immediately thereafter. A user interface is displayed informing the initiating user that the message is being sent or broadcast. Optionally, after a selected amount of time or after the message has been broadcast, substantially real-time broadcast results are presented via a user interface, such as that discussed below with respect to FIG. 2K. A back button 210I is provided, which, when activated, causes the message creation interface illustrated in FIG. 2G to be presented, enabling the user to edit or otherwise change the message.

FIG. 2J illustrates an example select method/schedule user interface for non-emergency or standard, routine messages for which there is no immediate urgency. The interface illustrated in FIG. 2J is similar to the interface discussed above with respect to FIG. 2I, and further includes a scheduling area used to schedule when a notification message is to be transmitted, how often the notification message is to be repeated, a repeat period (for example, and without limitation, every day, every second day, every third day, once a week, every other week, every fourth week, once a month, every two months, every five months, every year, etc.), and at what date and/or time, if any, the message notifications are to cease.

In particular, the interface illustrated in FIG. 2J includes a schedule message delivery area 201J, select message delivery method area 202J, and a select result delivery method 204J. With respect to select message delivery method area 202J, a variety of delivery methods, previously defined by the org leader or otherwise, as available or appropriate for the corresponding organization, are presented with associated selection checkboxes or via links. In this example, the user can select one or more of home telephone, cell phone, email, email, fax, home fax, numeric pager, work phone, text pager, and company operator, though other methods can be authorized as well. The user can select or deselect the delivery methods or targets that the message would be delivered to as a result of the message broadcast. A "Confirm" check box 206J is provided. If checked or otherwise selected by the user, a receipt confirmation will be sought or requested from the message recipients. Optionally, by default, the confirm check box 206J is selected.

With respect to scheduling message delivery, in this example embodiment, schedule message delivery area 201J enables users to select a schedule now option 208J and a schedule later option 210J. A determination is made at state 320 of FIG. 3 as to which option is selected. One of the options 208J, 210J can be selected by default. In this example, the schedule now option 208J is selected, and the process proceeds to state 326 once the user activates a start broadcast button or command. If the user selects the schedule later option 210J, the interface displays input fields for date and time as part of the schedule later option. The user then may enter a date and select the time via list boxes for month, date, year, hours, minutes and AM/PM, by typing in the date and time, or otherwise. The process then proceeds to state 322 of FIG. 3, and confirmation is provided to the user that the notification is scheduled, and the process then proceeds back to state 304.

Additionally the user may choose to setup the broadcast as a repeating broadcast via the repeat schedule function 212J. A repeating broadcast is made or transmitted at specified intervals until a specified ending date. In this example, the user can select an interval type (days, weeks, months, years) and the interval duration for the repetition. An ending date field is also provided to select the ending date for the repeat broadcast. Optionally, a pop-up calendar is displayed via which the user can select the ending date. Once the user has provided the appropriate information and activates a send message button, the scheduled broadcast is added to a list of pending scheduled notifications broadcasts, and a message confirming that the notification broadcast is scheduled will be displayed to the user. Optionally, the user is redirected to the notification initiation interface, discussed above with respect to FIG. 2B. Once a broadcast occurs, substantially real-time broadcast results are optionally presented via a user interface, such as that discussed below with respect to FIG. 2K.

Broadcast results are provided or displayed to the user at state 328 of FIG. 3. A broadcast results user interface used to provide reports of the results of a broadcast notification will now be discussed with reference to FIG. 2K. Optionally, the broadcast results user interface automatically refreshes upon a change in the results, periodically, and/or in response to a user initiated refresh command, to thereby provide substantially real time or live results as the message broadcast process is taking place. In the illustrated example, the user interface includes:

a broadcast notification identifier area 201, that includes a manually or system generated broadcast identifier, as well as an indication as to whether broadcast is an emergency or non-emergency broadcast;

a message title area 202K, that displays the message title as entered by the user at state 314A;

a message text area 204K, that displays the message text entered by the user at state 314;

a details area 206K, that displays one or more of:
  Initiated by—Name or identifier associated with the broadcast initiator
  Start Date—Date and time when the broadcast began
  Finish Date—Date and time when the broadcast finished (if the broadcast has completed)
  Elapsed Time—Number of seconds or other time unit since the broadcast started
  Response Rate—Percentage of message recipients who have responded or confirmed message receipt
  Terminated By—If the broadcast is stopped before normal completion, the name or identifier associated with the user who manually terminated the broadcast
  Termination date—If the broadcast is stopped before normal completion, the date and/or time of the premature termination
  Confirmation Requested—an indication, such as Y or N, as to whether confirmation of message is sought from recipients
  Attachment—Filename of the attachment to the broadcast if any A delivery results area 208K, that displays one or more of:
  Confirmed—the number of users who have confirmed receipt of the notification message. Optionally, this number is also a link (such as a hyperlink), wherein activation of the link, such as by clicking on the link, causes a list of the users who have confirmed receipt of the message to be presented in a pop-up window or otherwise.
  Not Confirmed—the number of users to whom the notification message was delivered but who have not confirmed receipt of the message. Optionally, this number is also a link, wherein activation of the link, such as be clicking on the link, causes a list of the users to whom the notification message was delivered but who have not confirmed receipt of the message to be presented in a pop-up window or otherwise.
  Unreachable—the number of users who could not be reached on any of the contact paths provided by the users. Optionally, this number is also a link, wherein activation of the link, such as be clicking on the link, causes a list of the users who were unreachable to be presented.

A delivery methods area 210K displays the contact paths selected for delivery with respect to the notification broadcast being reported on.

A user can halt an in-progress notification broadcast at state 330 of FIG. 3. For example, activation of a stop broadcast button 212K causes the broadcast being reported on to be halted substantially immediately, even though the notification broadcast has not completed. The process then proceeds to state 328 of FIG. 3, and the final broadcast results are reported.

If the broadcast notification includes a voice message, activation of a review voice button opens a popup window with, or otherwise displays playback controls (for example, play, rewind, and fast forward controls) for an embedded media player to enable the user to playback and listen to the voice message. Similarly, if the broadcast notification includes a video message, a "review video" button can optionally be provided (not shown), activation of which causes the display of controls and a video window that enables the user to review the video message. A print button is optionally provided, activation of which causes the broadcast results to be printed to a file, such as a PDF file, and/or to a printer.

A user can also track active broadcasts via a track active broadcasts user interface, an example of which is illustrated in FIG. 2L, which provides the active broadcast IDs, titles, initiator name, starting date, and stop option. By click on the ID or other appropriate link, the user is optionally presented with report details for the corresponding broadcast.

Optionally, if the notification broadcast has been automatically completed or manually halted, a re-broadcast button is displayed or enabled, wherein activation of the re-broadcast button by the user causes the process illustrated in FIG. 3 to proceed back to state 326, or optionally, the notification system then automatically resends the broadcast to those recipients who did not confirm receipt or who were unreachable.

Optionally, a user can select a track active broadcast link or menu item which will cause a navigable list of messages with their respective identifiers (IDs), titles, initiator name or identifier, starting date and time, and/or stop date and time (if applicable).

As previously discussed, embodiments of the notification system enable members to be organized as groups, thereby enabling the efficient issuance of notifications and enabling the distribution of administrative duties on a group level. Groups can be composed of individual members and/or other groups, thereby allowing users to create a hierarchical structure, similar to an organization chart or a tree. Further, members can belong to more than one group. For example, an organization can define a group of managers and another group for a marketing department. The manager of the marketing department can belong to both of the manager group and the marketing department group.

Groups can be created in a top down process, wherein the higher level groups are defined first, or in a bottoms up process, wherein the lowest or lower level groups are defined first, or some combination of the two processes. For example, to create a hierarchical group structure, groups of members can be defined at the lowest level in a given organization. By way of illustration, if the lowest organizational level in an organization is a department, then a notification group can correspond to an organization department. Then, a next higher level group, such as a division level group, can be defined that includes several lower level groups, such as several department groups, as well as other individual members, and so on, up the organizational structure. Groups can also be defined for emergency purposes. For example, a city can define groups based on geographical location, and sub-groups based on building types (such as high rise, residential, wood, reinforced steel, etc.) within a given geographical group, so that appropriate different notification warning or instruction messages can be broadcast to recipients based on their location and on their building type. Similarly, a city or other entity can define a firefighter group and sub-groups, a police group and sub-groups, a hazmat group and sub-groups, and/or emergency medical group and sub-groups.

In addition, an authorized user can add, remove, rename, and delete groups via appropriate user interfaces, as discussed herein. Further, an authorized user can optionally add/create or remove/delete group leaders, and add or remove members in general, and/or members from selected groups.

Figure 4:
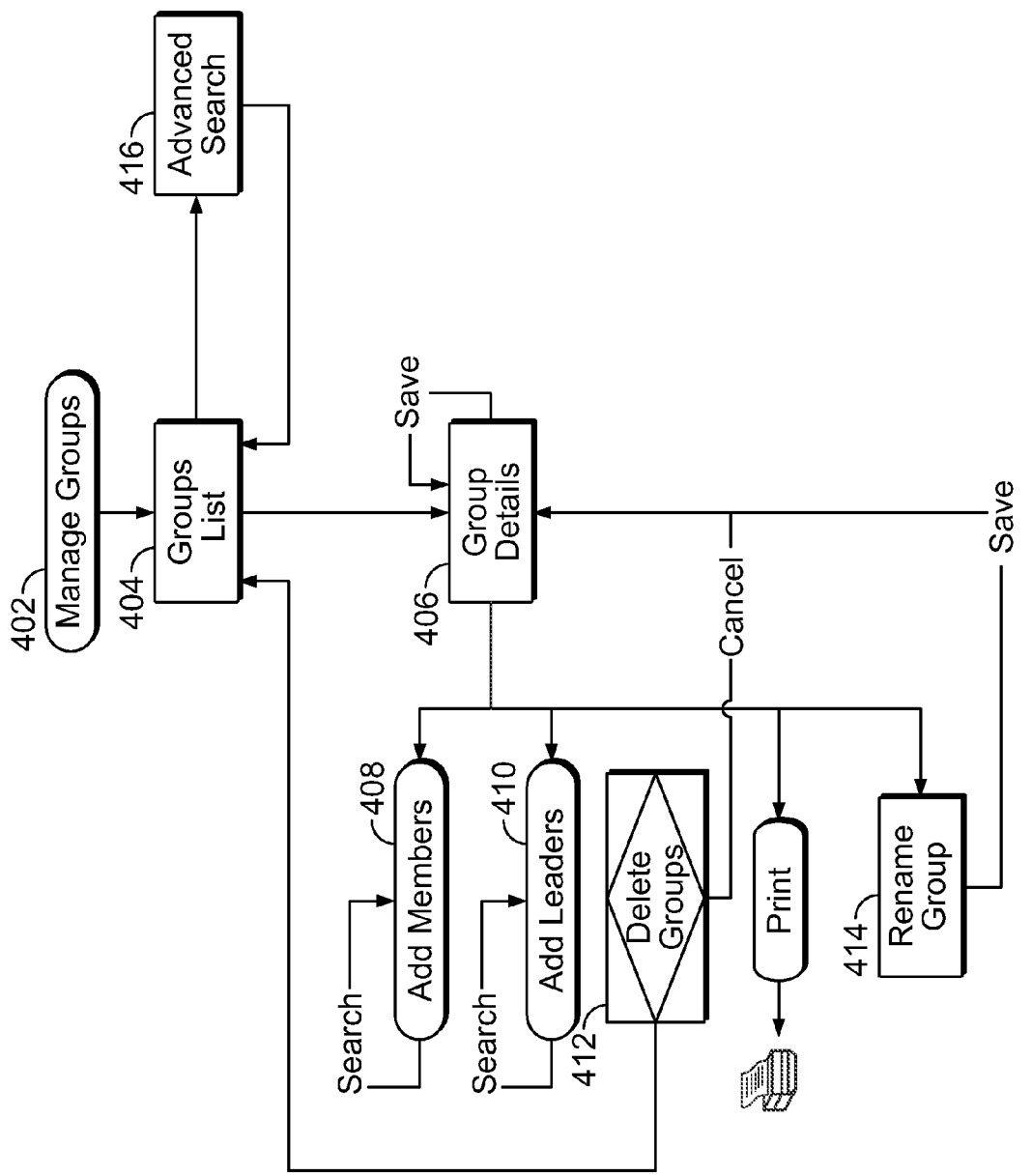
FIG. 4 illustrates a group management process.

FIG. 4 illustrates an example group management process. At state 402, in response to activating a manage groups command, an authorized user, such as an organization leader, is presented with a list of existing groups. Optionally, at state 416, the user can search for a group using one or more of the following example search parameters: group name or a portion thereof, date of creation, group creator, a name of a member of the group being searched for. The search results will include the names of the matching groups, wherein the names can be hyperlinks to group information. In response to the user selecting a group in the group list or in the search results, the user is presented with details regarding the selected group, such as the date of creation, the names of the group members, and the names of one or more group leaders. At state 408, the user can optionally add members to the group by activating an add group member command, in response to which a list of organization members is presented. The user can select one or more of those members, which will then be added to the group. Similarly, a user can remove a group member by selecting a name in the group member list and activating a remove group member command.

At state 410 the user can optionally designate one or more group leaders by activating an add group leader command, in response to which a list of group members is presented. The user can select one or more of those group members, which will then be designated as group leaders. Similarly, a user can remove a group leader by selecting a name in the group leader list and activating a remove group leader command. At state 412 the user can optionally activate a remove group command to delete the selected group. At state 414, the user can optionally rename the selected group by editing the current group name and/or by entering a new name into a group naming field. In response to the user activating a save command, changes performed in the foregoing states are saved in the system database and the process proceeds back to state 406, wherein further group modifications can be made or from which the user can select another destination, such as state 404 or other menu.

Example group management user interface pages will now be discussed. FIG. 5A illustrates an example manage groups interface page, accessed via a menu, link, button, or otherwise. The example manage groups interface includes a navigable list of existing groups. In this example, the group list includes columns and data corresponding to the group names, group creator names, and group creation date. The user can select the group which has to be modified or managed by clicking on the group name or otherwise.

Figure 5B:
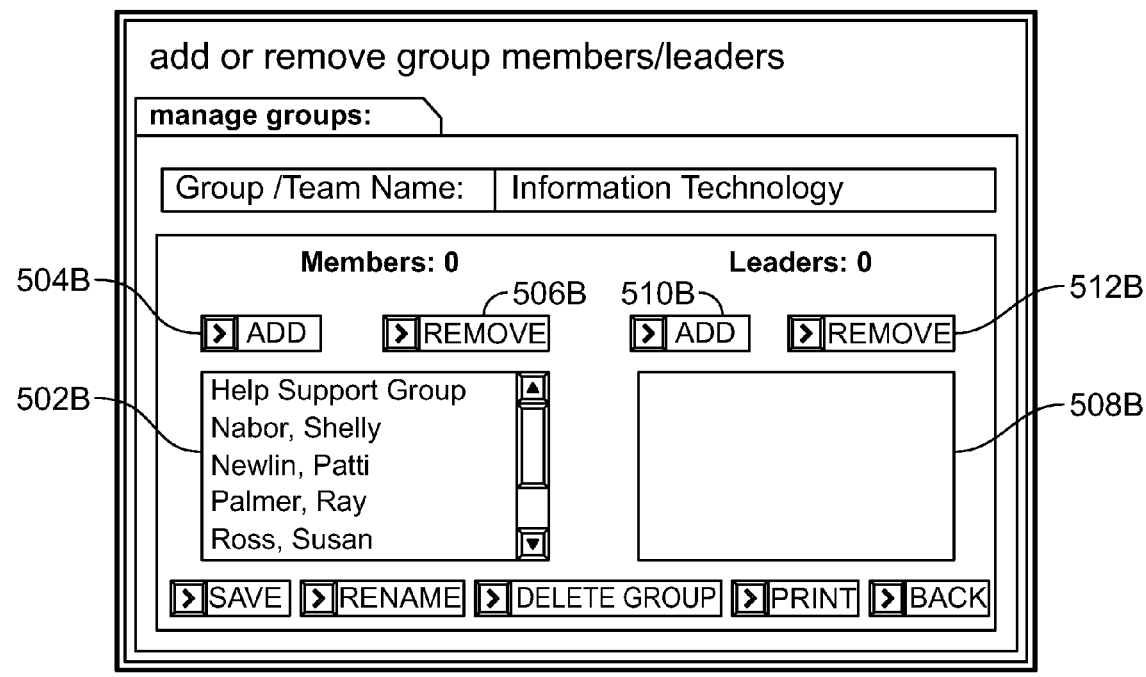

The user can then proceed to an add/remove members and/or team leaders user interface, an example of which is illustrated in FIG. 5B. The name of the group whose members or leaders are being managed is displayed. Two areas or list boxes 502B, 508B are presented which respectively display listed members and group leaders. Each area 502B, 508B has an associated add button 504B, 510B, and remove button 506B, 512B. In addition, save, rename, delete group, print, and back buttons are provided. Activation of the save button will cause the system to save the current state of the group, including the changes in members and leaders, to the system database. Activation of the rename button enables the user to rename the group via an edit form (not shown). The user can also delete the group being managed by activating the delete group button. Activation of the print button save and display the group member and leader information in PDF format that can be printed to the local printer or saved to the local storage by the user. Activation of the back button will return the user to manage groups interface page, such as that illustrated in FIG. 5A.

The user can remove a member of a group by clicking on or otherwise selecting a member name in area 502B, and then activating the remove button 506B, which will result in the system removing the member from the group and recording the change in the system database. The user can add a member to the group by clicking on or selecting the member add button 504B.

Clicking on the add button 504B causes the system to open a window or otherwise present a navigable list of members, an example of which is illustrated in FIG. 5C. By entering character strings in appropriate search fields, such as a first name, last name, and/or group name search field, and activating a search command, the user can search for a member based on first name, last name, and/or group name, and the system returns a list of matching member names, which can act as links. If the search fields are left blank, the search will return the entire list of members (though they may not all be viewable at the same time and the user may need to scroll through the list or select which of the search results the user wants to view) which the user is authorized to view. In response to the user clicking on a member name or otherwise selecting a member name from the member list, the system will add the selected member to the designated group selected using the interface illustrated in FIG. 5B.

In response to activation of the leaders add button 510B, the notification system opens a new window or otherwise displays a navigable list of members who can be leaders, such as group leaders. The window or other display can be the same as or similar to the illustrated in FIG. 5B. After selecting a leader from the list and clicking on close window link, the user is taken back to the manage groups page illustrated in FIG. 5B, with the selected leader added to the leaders list in the leaders area 508B. Selecting a leader from the leaders area 508B and clicking on the remove button 512B will cause the system to remove the selected leader from the area 508B and the system will record in the system database that the member is no longer a leader of the group upon activation of the save button, or simply in response to activation of the remove button 512B.

Figure 5D:
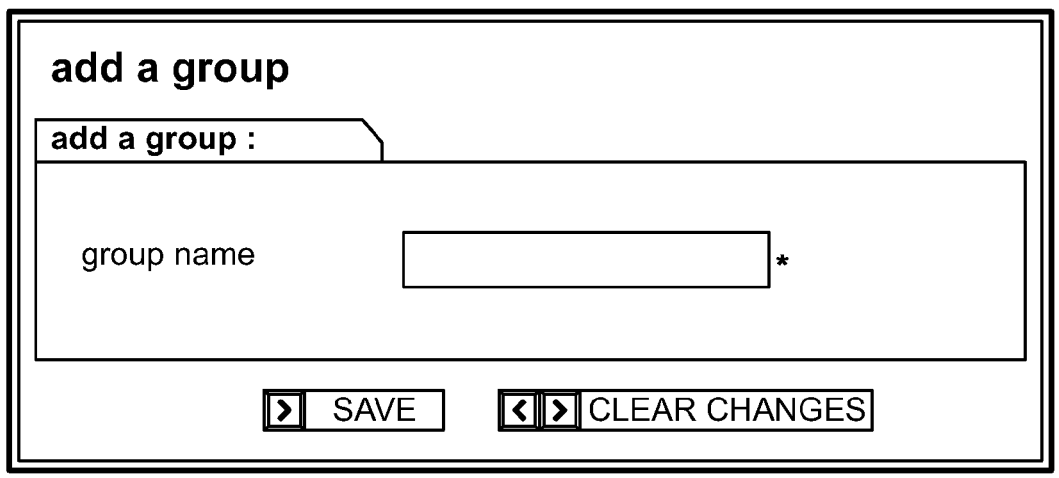
Figure 6A:
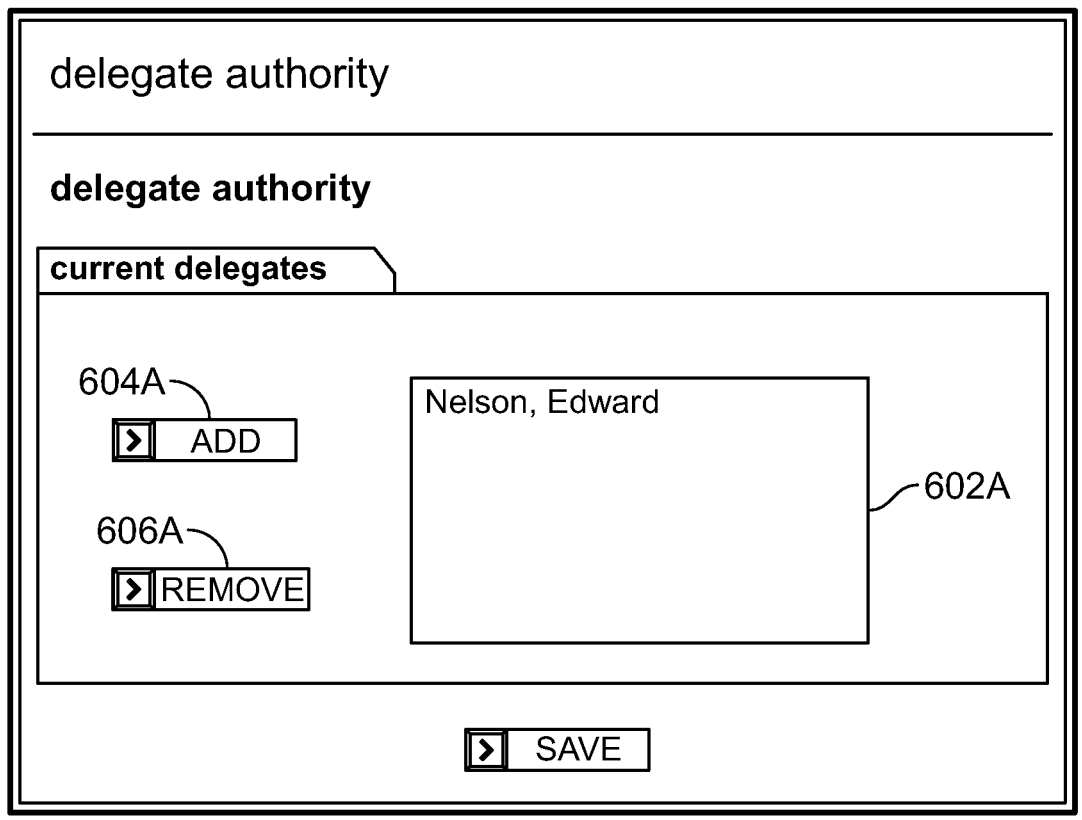

In response to selecting an "add groups" link or menu selection, the user is presented with an add groups interface, an example of which is illustrated in FIG. 5D which enables a user to create a group and to assign a name to the group. The user names the group by entering the name in a group name field. Activation of the "save" button or link will cause the system to store the group name and a new group will be created. Groups can be created as a collection of individual members with designated roles, groups can be created based on departments, or otherwise created. After activation of the save button or link, the user will be presented with the add/remove members and/or team leaders user interface, previously discussed with respect to FIG. 5B Authority or role delegation will now be discussed with reference to the figures. As similarly discussed above, an org leader is optionally entitled to assign or delegate the role or authority of organization leader to one or more members of the organization. In an example embodiment, the organization leader can manage all notification groups within the organization, can add members to the organization's notification member list, and can send notifications to all groups within the organization. He/she may also add members as well as delegate authority to other members. An example authority delegation process includes the acts of:

Select Member (Delegate)
Select and/or search for Delegates
Add to Delegates List In response to the user selecting a delegate authority link or menu item, the notification system user will be taken to the delegate authority user interface page, which displays a list of existing/current delegates and controls for adding and removing delegates. FIG. 6A illustrates an example delegate authority user interface. A list area 602A is provided to list the current delegates. An add button 604A is provided to add delegates. A remove button 606A is provided to remove delegates. In response to the user click on the add button 604A, a navigable list of members is displayed, an example of which is illustrated in FIG. 6B. In response to the user click on a member name, the selected member will be added to the delegate list. The user can also search for members to add to the delegate list by name or a portion thereof via a delegate search field or page. To remove a delegate, the user can select a delegate name in list area 602A and activate the remove button 606A, and the selected delegate will be removed as a delegate and from the delegate list.

As previously discussed, in one embodiment, the notification system includes or can access a "reverse 911 database" which can be used to identify and access phone numbers in a selected geographic area via a geographic information system ("GIS"). The geographic information system can include a server, such as server 132 illustrated in FIG. 1, that hosts a GIS-based application and mapping software, such as ArcIMS/ArcSDE mapping software. By way of example, the GIS-based application can be accessed by a user through a web browser or other interface. The GIS-based application can display maps, including maps showing streets, highways, freeways, bridges, facilities, homes, geographic features, such as mountains or rivers, zip code boundaries, and/or governmental entity boundaries (such as county, city, or town boundaries). The GIS-based application can further provide online map functionality such as zooming and panning with respect to the electronic maps displayed on the user terminal; the ability to add, store, display multiple data layers; the ability to control the scale factor of a layer, the ability to turn off a layer when zooming out and turning on a layer when zooming in; the ability to choose colors and symbols for each map layer (i.e., blue for water, red for roads, etc.).

By way of example, via the GIS-based application, the user can geographically select an area or calling zone for which a notification is needed, such as in the event of an emergency (for example, a fire, police activity, or the like), then access a reverse 911 database and process contact information for the selected target recipients to quickly provide notifications regarding the evacuation of the public and the notification of response personnel, such as police, fireman, and ambulances, during the emergency.

The desired calling zone area can be selected via highlighting or "lassoing" a desired area on a map displayed on the user terminal, by selecting a point or line segment and defining a buffer around the point or line segment (such a specifying a 50 mile radius around a selected point or specifying a range of city blocks around the selected point) or via other selection techniques (such as entering a zip code in a zip code field, a city name in a city field, providing an address and a radius distance relative to the address, etc.)

The notification system attempts to contact each targeted person via publicly available numbers (for example, numbers in an electronic white and/or yellow pages, and or numbers available to entities that have been authorized to access the reverse 911 database numbers by the municipality in which the calling zone lies) including telephone, pager or fax using numbers stored in the reverse 911 database. Some reverse 911 databases may include unpublished numbers, and some reverse 911 databases will not include unpublished or private numbers. The notifications can then be broadcast. As similarly discussed above, the notification can request confirmation of receipt, which can then be tracked by the notification system and reported to the notification initiator or other designated user. Optionally, people within a covered area can enter their location along with all phone numbers used to reach them in an emergency which can be recorded in the reverse 911 database.

In addition, in one embodiment, if a targeted person is a notification system member/user or has otherwise recorded their contact paths and optionally the associated priorities in the notification system database, the user/member can be notified of an incident in a specific affected area via the recorded contact paths, as described above, even if the user is outside the affected area during incident.

Once a call zone has been established and a notification process has been initiated, the notification system will compare the numbers returned by the reverse 911 database against the notification system member database. If a match for a number is found, the GIS-based application identifies the associated member as a targeted recipient, and thus contacts that member via the targeted recipient's contact paths as recorded by the notification system.

For example a city or municipality can subscribe to the notification system, and can act as an organization as described above. The municipality can utilize the notification system to notify residents and businesses residing or located in a designated area of a chemical spill or other geographically limited emergency. Optionally, some or all of the municipality residents and businesses can be registered members of the notification system and can define their contact paths and priorities as described above. For example, the residents and businesses can provide contact paths to or for their home phone, cell or wireless phone, work phone, pager, email, instant messaging service, fax, Blackberry, SMS address, instant messaging identifier, electronic chat identifier, wireless personal digital assistant, wireless laptops, and/or other terminals, where they would like to be reached in the event of the city or municipality initiating an area or calling zone-based notification.

Figure 7:
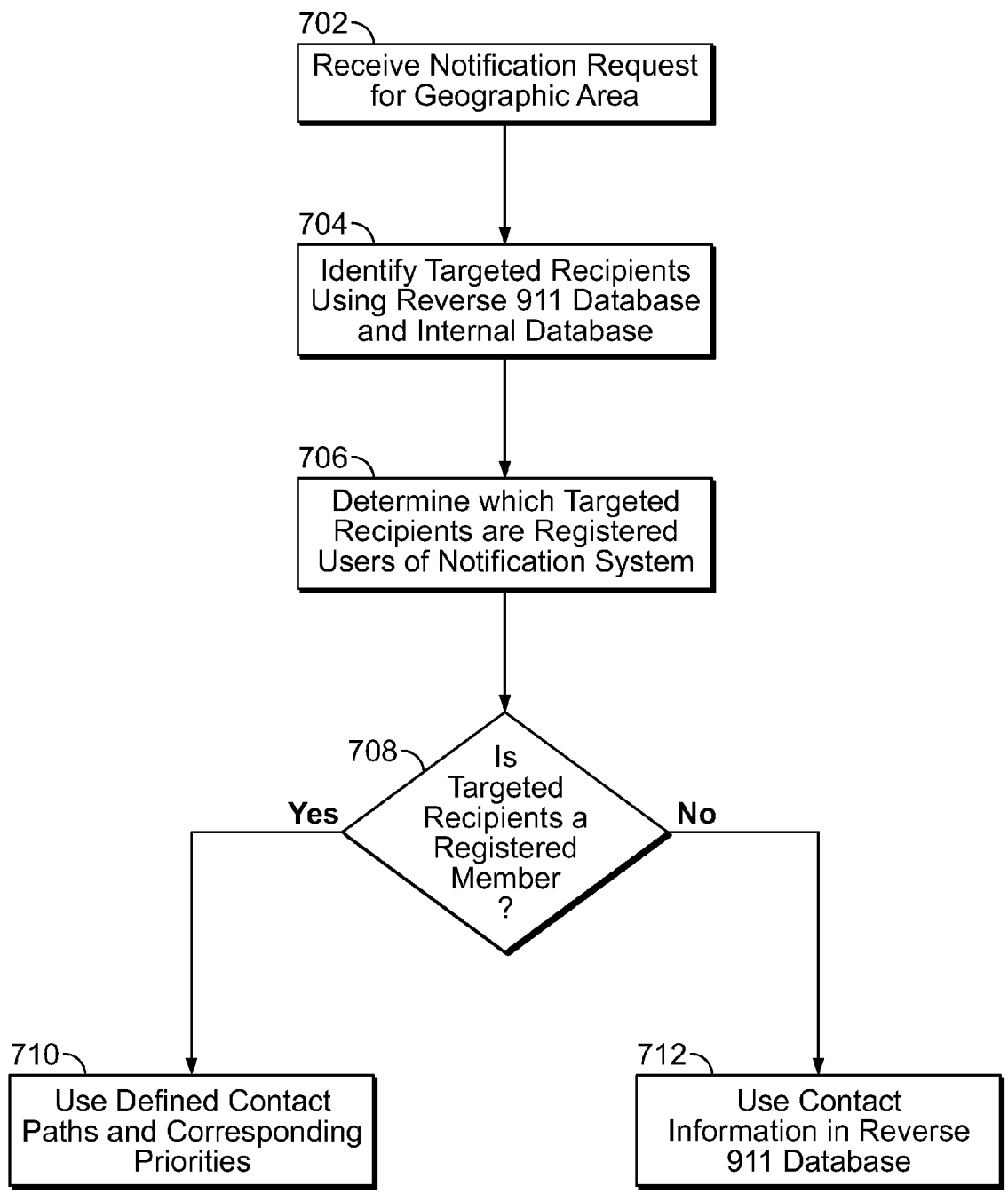
FIG. 7 illustrates an example notification process utilizing a reverse 911 directory.

In particular, with reference to FIG. 7, at state 702 a notification request or instruction is received for a selected area or calling zone. The selected area or calling zone may have been selected using one or more of the techniques described above, such as by providing a zip code or by graphically selecting a point and defining a buffer area. At state 704, the notification system accesses a reverse 911 database, which may be maintained and operated by a phone company or other entity, to identify phone numbers, fax numbers, and/or pager numbers located in the selected area or call zone. At state 706, the notification system compares the numbers returned by the reverse 911 database against those stored in the notification system member database, such as that associated with database server 106 illustrated in FIG. 1. If a match for a number is found, the GIS-based application identifies the associated member as a targeted recipient, and at state 710, the notification system will contact that member via the member's contact paths as recorded by the notification system and optionally in accordance with the associated contact order or priority. If a match for a given number is not found, then at state 712 the notification is provided using the number or numbers in the reverse 911 database.

Thus, embodiments of the systems and processes described herein advantageously enable members of an organization to access and maintain their own notification contact information directly. Members can input, update, and maintain their own contact information and can selectively designate the privacy level of their contact information. Further, members can prioritize their contact paths and associated priorities for emergency and/or non-emergency notifications. Optionally, certain embodiments allow a notification hierarchy to be established, wherein members at different levels of the hierarchy have different levels of permissions or rights to enable the efficient management of notifications by an organization. Further, certain embodiment optionally enable a single notification insert, such as a text message insertion, to be transmitted to a variety of different terminal types, such as voice and text terminals.

Although this invention has been described in terms of certain preferred embodiments, other embodiments that are apparent to those of ordinary skill in the art are also within the scope of this invention.

What is claimed is:

1. A method of managing electronic notifications, the method comprising:
storing in non-transitory, tangible computer readable memory associated with a notification system a first role designation for a first user, wherein the first role designation is associated with a first plurality of permissions, including permissions to:
add members to an organization set;
halt notification broadcasts before they are completed;
initiate notifications to members in the organization set;
review notification broadcast results for notification broadcasts to members of the organization set;
define groups, including at least a first group, the groups including subsets of the organization set members; and
delegate at least a portion of first role permissions to selected organization set members;
storing in non-transitory, tangible computer readable memory a second role designation for a second user, wherein the second role designation is associated with a subset of the first plurality of permissions, the subset including less than all first plurality of permissions, the subset of permissions including at least permissions to:
initiate notifications to members in the first group;
review notification broadcast results for notification broadcasts to members of the first group; and
storing in non-transitory, tangible computer readable memory a third role designation for a third user, wherein the third role designation is associated with at least permissions to provide notification contact paths for the third user.

2. The method as defined in claim 1, wherein the second role designation is associated with a permission to delegate the subset of permissions.

3. The method as defined in claim 1, wherein the second role designation is not associated with permissions:
to add members to an organization set; or
to specify allowable contact paths that can be used to provide notifications to members in the organization set.

4. The method as defined in claim 1, wherein the first role designation is associated with a permission to specify allowable contact paths that can be used to provide notifications to members in the organization set.

5. The method as defined in claim 1, wherein the notification broadcast results includes:
an identifier associated with a broadcast initiator;
a broadcast start date; and
a response rate.

6. The method as defined in claim 1, wherein the notification broadcast results includes:
an identity of a member of the organization set who was notified;
a medium used to communicate the notification;
a date and a time when the notification was made;
a confirmation of receipt of the notification; and
a date and a time when the confirmation was received.

7. The method as defined in claim 6, wherein the notification broadcast results further includes:
an identity of a member of the organization set who failed to confirm receipt of the notification; and
an identity of a member of the organization set who was unreachable.

8. The method as defined in claim 7, wherein the notification broadcast results are displayed to a graphical user interface or exported to a file.

9. The method as defined in claim 1, wherein the notification broadcast results includes an indication as to whether confirmation was requested from recipients of the notification broadcast.

10. The method as defined in claim 1, wherein the notification broadcast results includes an indication as to whether a file was transmitted to recipients of the notification broadcast.

11. The method as defined in claim 1, wherein the notification system transmits one or more user interfaces to a terminal associated with the first user via which the first user can:
add members to an organization set;
halt notification broadcasts before they are completed;
initiate notifications to members in the organization set;
review notification broadcast results for notification broadcasts to members of the organization set; and
define groups, the groups including subsets of the organization set members, without manual intervention by others.

12. A method of managing electronic notifications, the method comprising:
storing in non-transitory, tangible computer readable memory associated with a notification system a plurality of role designations including at least a first role designation for a first user, a second role designation for a second user, and a third role designation for a third user,
wherein the first role designation is associated with a first plurality of permissions, including permissions to perform one or more of the following:
adding members to an organization set;
halting notification broadcasts before they are completed;
initiating notifications to members in the organization set;
reviewing notification broadcast results for notification broadcasts to members of the organization set;
defining groups, including at least a first group, the groups including subsets of the organization set members; and
delegating at least a portion of first role permissions to selected organization set members,
wherein the second role designation is associated with a subset of the first plurality of permissions including at least permissions to perform one or more of the following:
initiating notifications to members in the first group; and
reviewing notification broadcast results for notification broadcasts to members of the first group; and
wherein the third role designation is associated with at least permissions to provide notification contact paths for the third user.

13. The method as defined in claim 12, wherein the second role designation is associated with a permission to delegate the subset of the first plurality of permissions.

14. The method as defined in claim 12, wherein the first role designation is associated with a permission to specify allowable contact paths that can be used to provide notifications to members in the organization set.

15. The method as defined in claim 12, wherein the notification broadcast results includes one or more of:
an identifier associated with a broadcast initiator;
a broadcast start date;
a response rate;
an identity of a member of the organization set who was notified;
a medium used to communicate the notification;
a date and a time when the notification was made;
a confirmation of receipt of the notification; and
a date and a time when the confirmation was received.

16. The method as defined in claim 15, wherein the notification broadcast results further includes:
an identity of a member of the organization set who failed to confirm receipt of the notification; and
an identity of a member of the organization set who was unreachable.

17. The method as defined in claim 16, wherein the notification broadcast results are displayed to a graphical user interface or exported to a file.

18. The method as defined in claim 12, wherein the notification broadcast results includes an indication as to whether confirmation was requested from recipients of the notification broadcast.

19. The method as defined in claim 12, wherein the notification broadcast results includes an indication as to whether a file was transmitted to recipients of the notification broadcast.

20. The method as defined in claim 12, wherein the notification system transmits one or more user interfaces to a terminal associated with the first user via which the first user can:
add members to an organization set;
halt notification broadcasts before they are completed;
initiate notifications to members in the organization set;
review notification broadcast results for notification broadcasts to members of the organization set; and
define groups, the groups including subsets of the organization set members, without manual intervention by others.

* * * * *